US012792922B2

(12) United States Patent
Singh et al.

(10) Patent No.: US 12,792,922 B2
(45) Date of Patent: Nov. 10, 2026

(54) MACHINE LEARNING MODEL UPDATE BASED ON DATASET OR FEATURE UNLEARNING

(71) Applicant: SONY GROUP CORPORATION, Tokyo (JP)

(72) Inventors: Brijraj Singh, Bengaluru (IN); Raksha Jalan, Bengaluru (IN); Prosenjit Biswas, Bengaluru (IN)

(73) Assignee: SONY GROUP CORPORATION, Tokyo (JP)

(*) Notice: Subject to any disclaimer, the term of this patent is extended or adjusted under 35 U.S.C. 154(b) by 939 days.

(21) Appl. No.: 18/159,902

(22) Filed: Jan. 26, 2023

(65) Prior Publication Data

US 2023/0316086 A1 Oct. 5, 2023

Related U.S. Application Data

(60) Provisional application No. 63/362,139, filed on Mar. 30, 2022.

(51) Int. Cl.
*G06N 3/09* (2023.01)
*G06N 3/045* (2023.01)
*G06N 3/0464* (2023.01)

(52) U.S. Cl.
CPC ............... *G06N 3/09* (2023.01); *G06N 3/045* (2023.01); *G06N 3/0464* (2023.01)

(58) Field of Classification Search
CPC ........ G06N 3/09; G06N 3/045; G06N 3/0464; G06N 3/049
See application file for complete search history.

(56) References Cited

U.S. PATENT DOCUMENTS

2017/0269708 A1 9/2017 Ouyang et al.
2019/0370665 A1* 12/2019 David ...................... G06N 3/04
(Continued)

FOREIGN PATENT DOCUMENTS

JP 2015166962 A 9/2015
JP 2018106662 A 7/2018
(Continued)

OTHER PUBLICATIONS

Warnecke, Alexander, et al. "Machine unlearning of features and labels." arXiv preprint arXiv:2108.11577 (2021). https://arxiv.org/pdf/2108.11577v1 (Year: 2021).*
(Continued)

*Primary Examiner* — Michael H Hoang
(74) *Attorney, Agent, or Firm* — CHIP LAW GROUP

(57) ABSTRACT

An electronic device and a method for implementation for machine learning model update based on dataset or feature unlearning are disclosed. The electronic device receives a data subset of a first dataset associated with a user. A first machine learning model is trained based on the first dataset. The electronic device trains a second machine learning model based on the received data subset. The electronic device applies a transformation function on the trained first machine learning model based on the trained second machine learning model. The electronic device updates the trained first machine learning model, based on the application of the transformation function. The update of the trained first machine learning model corresponds to an unlearning of at least one of the received data subset or a set of features associated with the second machine learning model.

16 Claims, 11 Drawing Sheets

(56) References Cited

U.S. PATENT DOCUMENTS

| | | | | |
|---|---|---|---|---|
| 2021/0279563 | A1 | 9/2021 | Sgobba | |
| 2023/0118785 | A1* | 4/2023 | Ullah | G06N 3/088 706/25 |

FOREIGN PATENT DOCUMENTS

| | | | |
|---|---|---|---|
| JP | 6854995 | B1 | 4/2021 |
| WO | 2022/058084 | A1 | 3/2022 |

OTHER PUBLICATIONS

Cao, Yinzhi, and Junfeng Yang. "Towards making systems forget with machine unlearning." 2015 IEEE symposium on security and privacy. IEEE, 2015. https://ieeexplore.ieee.org/stamp/stamp.jsp?tp=&arnumber=7163042 (Year: 2015).*

Golatkar, Aditya, Alessandro Achille, and Stefano Soatto. "Eternal Sunshine of the Spotless Net: Selective Forgetting in Deep Networks." arXiv preprint arXiv:1911.04933 (2019). https://arxiv.org/pdf/1911.04933 (Year: 2020).*

Xu, Jingjing, et al. "Understanding and improving layer normalization." Advances in neural information processing systems 32 (2019). https://proceedings.neurips.cc/paper_files/paper/2019/file/2f4fe03d77724a7217006e5d16728874-Paper.pdf (Year: 2019).*

Lu, Dawei, et al. "Anomaly detection method for substation equipment based on feature matching and multi-Semantic classification." 2021 6th Asia Conference on Power and Electrical Engineering (ACPEE). IEEE, 2021. https://ieeexplore.IEEE.org/stamp/stamp.jsp?tp=&arnumber=9437096 (Year: 2021).*

Chen, et al., "Recommendation Unlearning", WWW '22: Proceedings of the ACM Web Conference 2022, International World Wide Web Conference, Virtual Event, Lyon, France, Apr. 25, 2022, pp. 2768-2777.

Brophy, et al, "Machine unlearning for random forests", Proceedings of the 38th International Conference on Machine Learning, Jul. 2021, pp. 1092-1104.

Sommer, et al., "Towards Probabilistic Verification of Machine Unlearning", Machine Learning, Computer Science, arXiv:2003.04247, Dec. 1, 2020, 21 pages.

Bourtoule, et al., "Machine Unlearning", 2021 IEEE Symposium on Security and Privacy (SP), May 24-27, 2021, pp. 141-159.

Chen, et al., "When Machine Unlearning Jeopardizes Privacy", Proceedings of the 2021 ACM SIGSAC Conference on Computer and Communications Security, Nov. 2021, pp. 896-911.

Alessandro Mantelero, "The EU Proposal for a General Data Protection Regulation and the Roots of the Right to Be Forgotten", Computer Law & Security Review, vol. 29, No. 3, Jun. 28, 2013, pp. 229-235.

"Announcement: Privacy commissioner seeks federal court determination on key issue for canadians' online reputation", Office of the Privacy Commissioner of Canada, URL: https://www.priv.gc.ca/en/opc-news/news-and-announcements/2018/an_181010/, Oct. 10, 2018, 02 pages.

Shastri, et al., "The seven sins of personal-data processing systems under GDPR", USENIX HotCloud, Jul. 8, 2019, 07 pages.

"Bill text-AB-375", Assembly Bill, California Legislative Information, URL: https://www.ics.uci.edu/~sjordan/courses/ics11/case_studies/AB375-2017.pdf?bill_id=201720180AB375, Feb. 9, 2017, 09 pages.

Ghai Bhavya et al: "Multi-Level Ensemble Learning based Recommender System", Jan. 1, 2018 (Jan. 1, 2018), pp. 1-13, XP093048309.

* cited by examiner

MACHINE LEARNING MODEL UPDATE BASED ON DATASET OR FEATURE UNLEARNING

CROSS-REFERENCE TO RELATED APPLICATIONS/INCORPORATION BY REFERENCE

This application also makes reference to U.S. Provisional Application Ser. No. 63/362,139, which was filed on Mar. 30, 2022. The above stated patent applications are hereby incorporated herein by reference in their entirety.

FIELD

Various embodiments of the disclosure relate to machine learning models. More specifically, various embodiments of the disclosure relate to an electronic device and method for machine learning model update based on dataset or feature unlearning.

BACKGROUND

Advancements in software technology have led to development and use of machine learning (ML) models of various types. The ML models may be employed in a variety of applications, such as, to make predictions, recommendations, classifications, and the like. Typically, the ML model may be trained for any application area. The training may be achieved by use of a training dataset that may be provided to the ML model. The training dataset may include datapoints across various features and a predefined label associated with each datapoint. The ML model may be trained based on analysis of a correlation or an association between the various features and the corresponding predefined label. However, in some cases, the training dataset may include erroneous data. The training of the ML model based on such erroneous data may lead the ML model to produce misleading or wrong output, such as, inaccurate predictions, or wrong classes, and the like.

Limitations and disadvantages of conventional and traditional approaches will become apparent to one of skill in the art, through comparison of described systems with some aspects of the present disclosure, as set forth in the remainder of the present application and with reference to the drawings.

SUMMARY

An electronic device and method for machine learning model update based on dataset or feature unlearning is provided substantially as shown in, and/or described in connection with, at least one of the figures, as set forth more completely in the claims.

These and other features and advantages of the present disclosure may be appreciated from a review of the following detailed description of the present disclosure, along with the accompanying figures in which like reference numerals refer to like parts throughout.

DETAILED DESCRIPTION

Figure 1:
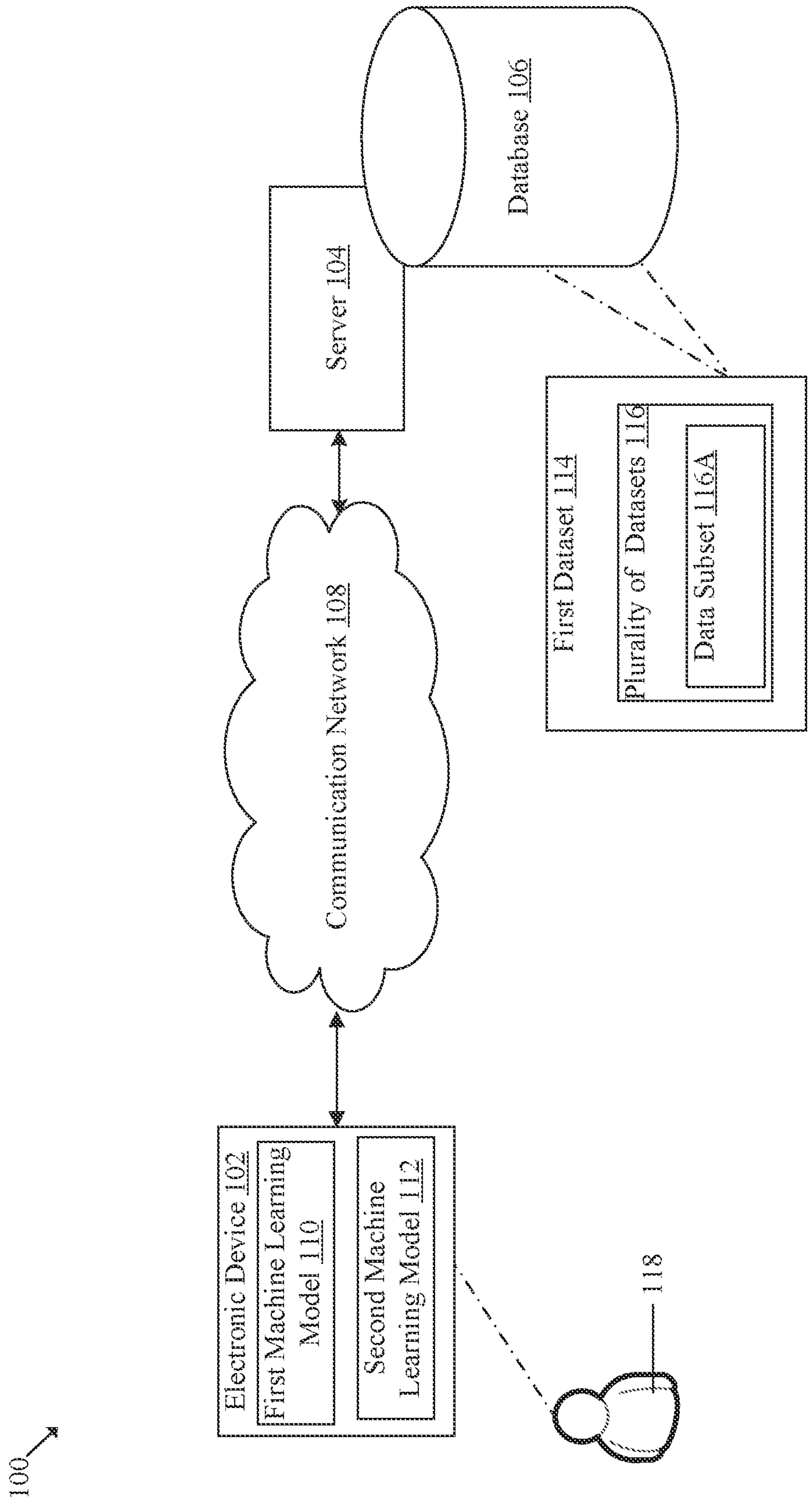
FIG. 1 is a block diagram that illustrates an exemplary network environment for machine learning model update based on dataset or feature unlearning, in accordance with an embodiment of the disclosure.

The following described implementation may be found in an electronic device and method for machine learning model update based on dataset or feature unlearning. Exemplary aspects of the disclosure may provide an electronic device that may receive a data subset of a first dataset associated with a user. A first machine learning model may be trained based on the received first dataset associated with the user. In an example, datapoints in a dataset may be generated at certain time and may have an associated timestamp. The electronic device may enable users to provide a user input indicative of a time interval associated with a wrongfully captured data (i.e., the data subset). The electronic device may train a second machine learning model based on the received data subset. The electronic device may further apply a transformation function on the trained first machine learning model based on the trained second machine learning model. The electronic device may further update the trained first machine learning model, based on the application of the transformation function on the trained first machine learning model. The update of the trained first machine learning model may correspond to an unlearning of at least one of the data subset or a set of features associated with the second machine learning model.

Typically, machine learning (ML) models may be trained to make predictions, recommendations, classifications, and the like, by training the ML model based on a training dataset. The ML model may provide an output (e.g., a prediction) associated with a given input or set of features, based on the training. However, in some cases, the training dataset may include erroneous data. The trained ML model may provide erroneous output in such cases. The electronic device of the present disclosure may train the first machine learning model based on the first dataset associated with the user. The electronic device may extract erroneous data from the first dataset, as the data subset. For example, the electronic device may determine or receive the data subset that may be erroneous, based on a user input indicative of a time interval corresponding to the particular dataset. The electronic device may further train the second machine learning model based on the received data subset. Thereafter, the electronic device may apply the transformation function on the trained first machine learning model based on the trained second machine learning model to update the trained first machine learning model based on the application of the transformation function. The update of the trained first machine learning model may correspond to the unlearning of at least one of the data subset or the set of features associated with the second machine learning model. Thus, the electronic device may enable unlearning of a certain wrongfully captured/erroneous dataset or undesired set of features in an existing model to obtain an updated model that achieves a desired output performance. The updated ML model may be optimum and may not make faulty recommendations as the least one of the data subset or the set of features associated with the second machine learning model may have been unlearnt by the trained first ML model.

FIG. 1 is a block diagram that illustrates an exemplary network environment for machine learning model update based on dataset or feature unlearning, in accordance with an embodiment of the disclosure. With reference to FIG. 1, there is shown a network environment 100. The network environment 100 may include an electronic device 102, a server 104, a database 106, and a communication network 108. The electronic device 102 may include a first machine learning model 110 and a second machine learning model 112. In FIG. 1, there is further shown a first dataset 114 comprising a plurality of datasets 116 such as, a data subset 116A. There is further shown a user 118, who may be associated with or operate the electronic device 102.

The electronic device 102 may include suitable logic, circuitry, interfaces, and/or code that may be configured to receive a data subset (such as, the data subset 116A) of a first dataset (such as, the first dataset 114) associated with a user (such as, the user 118). A first machine learning model (such as, the first machine learning model 110) may be trained based on the received first dataset (such as, the first dataset 114) associated with the user, and the first dataset may include the received data subset. The electronic device 102 may train a second machine learning model (such as, the second machine learning model 112) based on the received data subset 116A. Examples of the electronic device 102 may include, but are not limited to, a computing device, a smartphone, a cellular phone, a mobile phone, a gaming device, a mainframe machine, a server, a computer workstation, a machine learning device (enabled with or hosting, for example, a computing resource, a memory resource, and a networking resource), and/or a consumer electronic (CE) device.

The server 104 may include suitable logic, circuitry, and interfaces, and/or code that may be configured to apply a transformation function on the trained first machine learning model 110 and on the trained second machine learning model 112. The server 104 may be configured to update the trained first machine learning model 110, based on the application of the transformation function on the trained first machine learning model 110. The update of the trained first machine learning model 1110 may correspond to an unlearning of at least one of the data subset 116A or a set of features associated with the second machine learning model 112. The server 104 may be implemented as a cloud server and may execute operations through web applications, cloud applications, HTTP requests, repository operations, file transfer, and the like. Other example implementations of the server 104 may include, but are not limited to, a database server, a file server, a web server, a media server, an application server, a mainframe server, a machine learning server (enabled with or hosting, for example, a computing resource, a memory resource, and a networking resource), or a cloud computing server.

In at least one embodiment, the server 104 may be implemented as a plurality of distributed cloud-based resources by use of several technologies that are well known to those ordinarily skilled in the art. A person with ordinary skill in the art will understand that the scope of the disclosure may not be limited to the implementation of the server 104 and the electronic device 102, as two separate entities. In certain embodiments, the functionalities of the server 104 can be incorporated in its entirety or at least partially in the electronic device 102 without a departure from the scope of the disclosure. In certain embodiments, the server 104 may host the database 106. Alternatively, the server 104 may be separate from the database 106 and may be communicatively coupled to the database 106.

The database 106 may include suitable logic, interfaces, and/or code that may be configured to store the first dataset 114. The first dataset 114 may include the plurality of datasets 116, which may include datasets, such as, the data subset 116A. The database 106 may be derived from data off a relational or non-relational database, or a set of comma-separated values (csv) files in conventional or big-data storage. The database 106 may be stored or cached on a device, such as a server (e.g., the server 104) or the electronic device 102. The device storing the database 106 may be configured to receive a query for the first dataset 114 from the electronic device 102 or the server 104. In response, the device of the database 106 may be configured to retrieve and provide the queried first dataset 114 to the electronic device 102 or the server 104, based on the received query.

In some embodiments, the database 106 may be hosted on a plurality of servers stored at the same or different locations. The operations of the database 106 may be executed using hardware including a processor, a microprocessor (e.g., to perform or control performance of one or more operations), a field-programmable gate array (FPGA), or an application-specific integrated circuit (ASIC). In some other instances, the database 106 may be implemented using software.

The communication network 108 may include a communication medium through which the electronic device 102 and the server 104 may communicate with one another. The communication network 108 may be one of a wired connection or a wireless connection. Examples of the communication network 108 may include, but are not limited to, the Internet, a cloud network, Cellular or Wireless Mobile Network (such as Long-Term Evolution and $5^{th}$ Generation (5G) New Radio (NR)), satellite communication system (using, for example, low earth orbit satellites), a Wireless Fidelity (Wi-Fi) network, a Personal Area Network (PAN), a Local Area Network (LAN), or a Metropolitan Area Network (MAN). Various devices in the network environment 100 may be configured to connect to the communication network 108 in accordance with various wired and wireless communication protocols. Examples of such wired and wireless communication protocols may include, but are not limited to, at least one of a Transmission Control Protocol and Internet Protocol (TCP/IP), User Datagram Protocol (UDP), Hypertext Transfer Protocol (HTTP), File Transfer Protocol (FTP), Zig Bee, EDGE, IEEE 802.11, light fidelity (Li-Fi), 802.16, IEEE 802.11s, IEEE 802.11g, multi-hop communication, wireless access point (AP), device to device communication, cellular communication protocols, and Bluetooth (BT) communication protocols.

Each of the first machine learning (ML) model 110 and the second ML model 112 may be a recommendation model, which may be trained to identify a relationship between inputs, such as features in a training dataset and output labels, such as a recommended video file. Each ML model of the first ML model 110 and the second ML model 112 may be defined by its hyper-parameters, for example, number of weights, cost function, input size, number of layers, and the like. The parameters of the ML model may be tuned and weights may be updated so as to move towards a global minimum of a cost function for the ML model. After several epochs of the training on feature information in the training dataset, the ML model may be trained to output a prediction/classification result for a set of inputs. The prediction result may be indicative of a class label for each input of the set of inputs (e.g., input features extracted from new/unseen instances).

The ML model may include electronic data, which may be implemented as, for example, a software component of an application executable on the electronic device 102. The ML model may rely on libraries, external scripts, or other logic/instructions for execution by a processing device, such as, the server 104 or the electronic device 102. The ML model may include code and routines configured to enable a computing device, such as the server 104 or the electronic device 102 to perform one or more operations such as, to make recommendations to the user 118. Additionally, or alternatively, the ML model may be implemented using hardware including a processor, a microprocessor (e.g., to perform or control performance of one or more operations), a field-programmable gate array (FPGA), or an application-specific integrated circuit (ASIC). Alternatively, in some embodiments, the ML model may be implemented using a combination of hardware and software. Examples of the ML model may include a linear regression model, a logistic regression model, a decision tree model, a Support Vector Machine (SVM) model, a Naïve Bayes model, a k-nearest neighborhood (kNN) model, a K-means clustering model, a Random Forest model, a dimensionality reduction model (e.g., a Principal Component Analysis (PCA) model), or a Gradient Boosting model.

The first dataset 114 may include data associated with the user 118 that may be used to train the first machine learning model 110. For example, in a case where the first machine learning model 110 is a content-based recommendation model, the first dataset 114 may include one or more media contents with which the user 118 may have interacted (for example, watched or rated). For example, the first dataset 114 may include video files that the user 118 may have watched. Based on such video files, the first machine learning model 110 may make recommendations to the user 118. The first dataset 114 may include the plurality of datasets 116 such as, the data subset 116A. Each dataset of the plurality of datasets 116 may be stored as a data shard. In an embodiment, the first dataset 114 may be stored on the database 106. In another embodiment, the first dataset 114 may be stored on the electronic device 102.

The data subset 116A may include data associated with the user 118 that may be used to train the second machine learning model 112. The data subset 116A may be unwanted data, unlearnable data (and/or erroneous data/wrongly captured data) associated with the user 118. The data subset 116A may be extracted from the first dataset 114 to train the second machine learning model 112. In some embodiments, the data subset 116A may be extracted based on a first user input indicative of a time duration associated with the data subset 116A. Based on the extracted first dataset 114, the first machine learning model 110 may be updated. The recommendations made by the updated first machine learning model 110 may be independent of the data subset 116A. Thus, the first machine learning model 110 may unlearn features associated with the data subset 116A.

In operation, the electronic device 102 may be configured to receive the data subset 116A of the first dataset 114 associated with the user 118. The first machine learning model 110 may be trained based on the first dataset 114 associated with the user 118. The first dataset 114 associated with the user 118 may be behavioral data associated with the user 118. The behavioral data associated with the user 118 over a period of time may be collected and stored as the first dataset 114. The first machine learning model 110 may be trained based on the first dataset 114 associated with the user 118. The first dataset 114 may include the plurality of datasets 116. However, in some cases, one or more datasets of the plurality of datasets 116 may not be related to the behavior of the user 118. Such datasets, that may not be associated with the user 118 or may be erroneous representation of the behavior of the user 118, may be called as the data subset 116A. Details related to the first ML model 110 are further described, for example, in FIG. 3.

The electronic device 102 may be further configured to train the second machine learning model 112 based on the received data subset 116A. The second ML model 112 may be trained so as to make recommendations according to the received data subset 116A. Details related to the training of the second ML model 112 are further described, for example, in FIG. 8.

The electronic device 102 may be further configured to apply the transformation function on the trained first machine learning model 110 based on the trained second machine learning model 112. The transformation function may help to transform the trained first machine learning model 110 from a faulty state to an updated (or accurate) state so that the updated first ML model may make optimum recommendations. Details related to the transformation function are further provided, for example, in FIG. 8.

The electronic device 102 may be further configured to update the trained first ML model 110, based on the application of the transformation function on the trained first ML model 110. The update of the trained first ML model 110 may correspond to the unlearning of at least one of the data subset 116A or the set of features associated with the second machine learning model 112. The trained first ML model 110 may be updated so that the recommendations of the updated first ML model 110 may be independent of the data subset 116A or the set of features corresponding to the data subset 116A. Thus, faulty outputs of the first ML model 110, which may be associated with the data subset 116A, may be prevented, based on the update of the first ML model 110. Details related to the updating of the trained first ML model are further described, for example, in FIG. 8.

Figure 2:
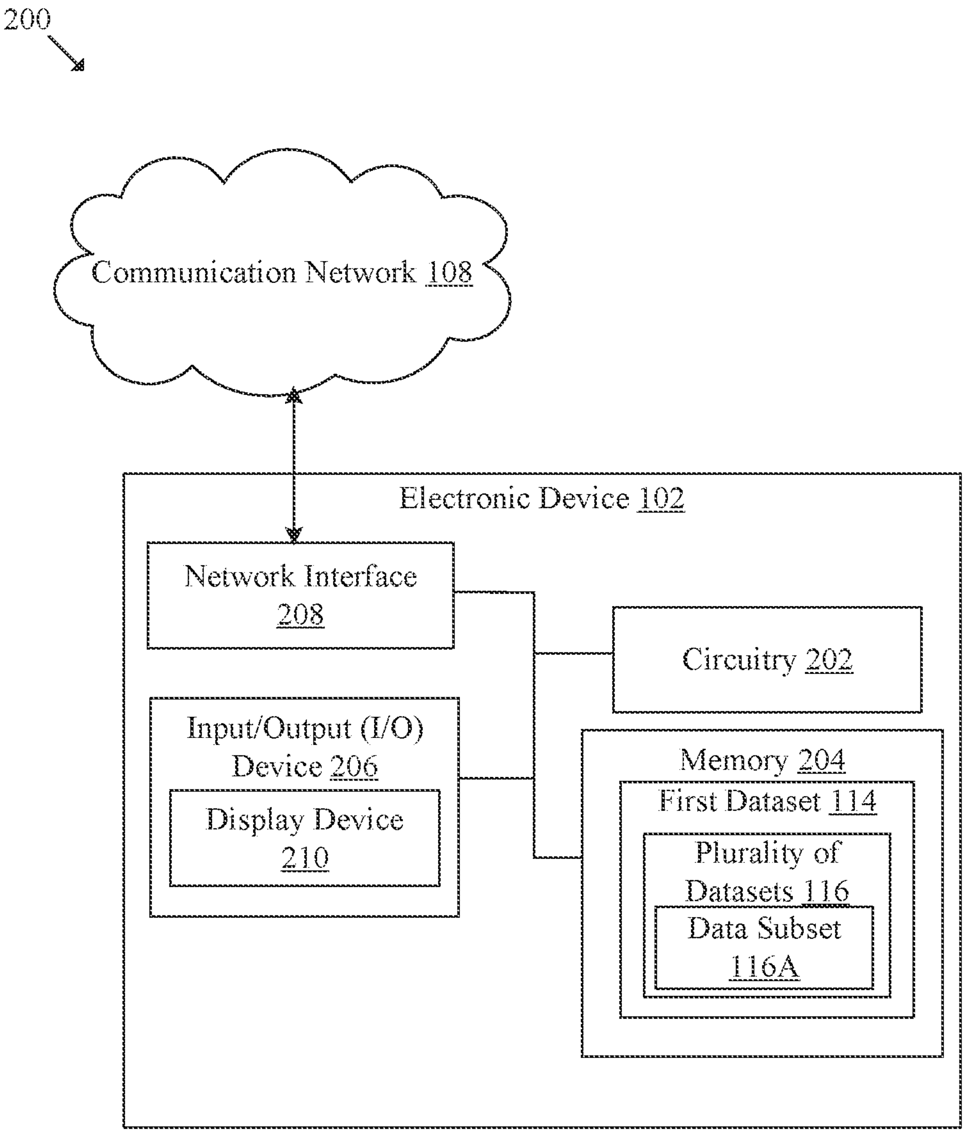
FIG. 2 is a block diagram that illustrates an exemplary electronic device of FIG. 1, in accordance with an embodiment of the disclosure.

FIG. 2 is a block diagram that illustrates an exemplary electronic device of FIG. 1, in accordance with an embodiment of the disclosure. FIG. 2 is explained in conjunction with elements from FIG. 1. With reference to FIG. 2, there is shown the exemplary electronic device 102. The electronic device 102 may include circuitry 202, a memory 204, an input/output (I/O) device 206, and a network interface 208. The memory 204 may store the first dataset 114 including the plurality of datasets 116, such as, the data subset 116A. The input/output (I/O) device 206 may include a display device 210.

The circuitry 202 may include suitable logic, circuitry, and/or interfaces that may be configured to execute program instructions associated with different operations to be executed by the electronic device 102. The operations may include a data subset reception, a training of second ML model, a transformation function application, and an update of first ML model. The circuitry 202 may include one or more processing units, which may be implemented as a separate processor. In an embodiment, the one or more processing units may be implemented as an integrated processor or a cluster of processors that perform the functions of the one or more specialized processing units, collectively. The circuitry 202 may be implemented based on a number of processor technologies known in the art. Examples of implementations of the circuitry 202 may be an X86-based processor, a Graphics Processing Unit (GPU), a Reduced Instruction Set Computing (RISC) processor, an Application-Specific Integrated Circuit (ASIC) processor, a Complex Instruction Set Computing (CISC) processor, a microcontroller, a central processing unit (CPU), and/or other control circuits.

The memory 204 may include suitable logic, circuitry, interfaces, and/or code that may be configured to store one or more instructions to be executed by the circuitry 202. The one or more instructions stored in the memory 204 may be configured to execute the different operations of the circuitry 202 (and/or the electronic device 102). The memory 204 may be configured to store the first dataset 114 including the plurality of datasets 116, such as, the data subset 116A. Examples of implementation of the memory 204 may include, but are not limited to, Random Access Memory (RAM), Read Only Memory (ROM), Electrically Erasable Programmable Read-Only Memory (EEPROM), Hard Disk Drive (HDD), a Solid-State Drive (SSD), a CPU cache, and/or a Secure Digital (SD) card.

The I/O device 206 may include suitable logic, circuitry, interfaces, and/or code that may be configured to receive an input and provide an output based on the received input. For example, the I/O device 206 may receive a first user input indicative of a selection of the first dataset 114 and/or the data subset 116A. The I/O device 206 may be further configured to display or render a recommendation output of the trained/updated first ML model 110 or the trained second ML model 112, the first dataset 114 and/or the data subset 116A. The I/O device 206 may include the display device 210. Examples of the I/O device 206 may include, but are not limited to, a display (e.g., a touch screen), a keyboard, a mouse, a joystick, a microphone, or a speaker. Examples of the I/O device 206 may further include braille I/O devices, such as, braille keyboards and braille readers.

The network interface 208 may include suitable logic, circuitry, interfaces, and/or code that may be configured to facilitate communication between the electronic device 102 and the server 104, via the communication network 108. The network interface 208 may be implemented by use of various known technologies to support wired or wireless communication of the electronic device 102 with the communication network 108. The network interface 208 may include, but is not limited to, an antenna, a radio frequency (RF) transceiver, one or more amplifiers, a tuner, one or more oscillators, a digital signal processor, a coder-decoder (CODEC) chipset, a subscriber identity module (SIM) card, or a local buffer circuitry.

The network interface 208 may be configured to communicate via wireless communication with networks, such as the Internet, an Intranet, a wireless network, a cellular telephone network, a wireless local area network (LAN), or a metropolitan area network (MAN). The wireless communication may be configured to use one or more of a plurality of communication standards, protocols and technologies, such as Global System for Mobile Communications (GSM), Enhanced Data GSM Environment (EDGE), wideband code division multiple access (W-CDMA), Long Term Evolution (LTE), 5th Generation (5G) New Radio (NR), code division multiple access (CDMA), time division multiple access (TDMA), Bluetooth, Wireless Fidelity (Wi-Fi) (such as IEEE 802.11a, IEEE 802.11b, IEEE 802.11g or IEEE 802.11n), voice over Internet Protocol (VoIP), light fidelity (Li-Fi), Worldwide Interoperability for Microwave Access (Wi-MAX), a protocol for email, instant messaging, and a Short Message Service (SMS).

The display device 210 may include suitable logic, circuitry, and interfaces that may be configured to display or render a recommendation output of the trained/updated first ML model 110 or the trained second ML model 112, the first dataset 114 and/or the data subset 116A. The display device 210 may be a touch screen which may enable a user (e.g., the user 118) to provide a user-input via the display device 210. The touch screen may be at least one of a resistive touch screen, a capacitive touch screen, or a thermal touch screen. The display device 210 may be realized through several known technologies such as, but not limited to, at least one of a Liquid Crystal Display (LCD) display, a Light Emitting Diode (LED) display, a plasma display, or an Organic LED (OLED) display technology, or other display devices. In accordance with an embodiment, the display device 210 may refer to a display screen of a head mounted device (HMD), a smart-glass device, a see-through display, a projection-based display, an electro-chromic display, or a transparent display. Various operations of the circuitry 202 for implementation of machine learning model update based on dataset or feature unlearning are described further, for example, in FIGS. 3, 4, 6, 7, 8, and 9.

Figure 3:
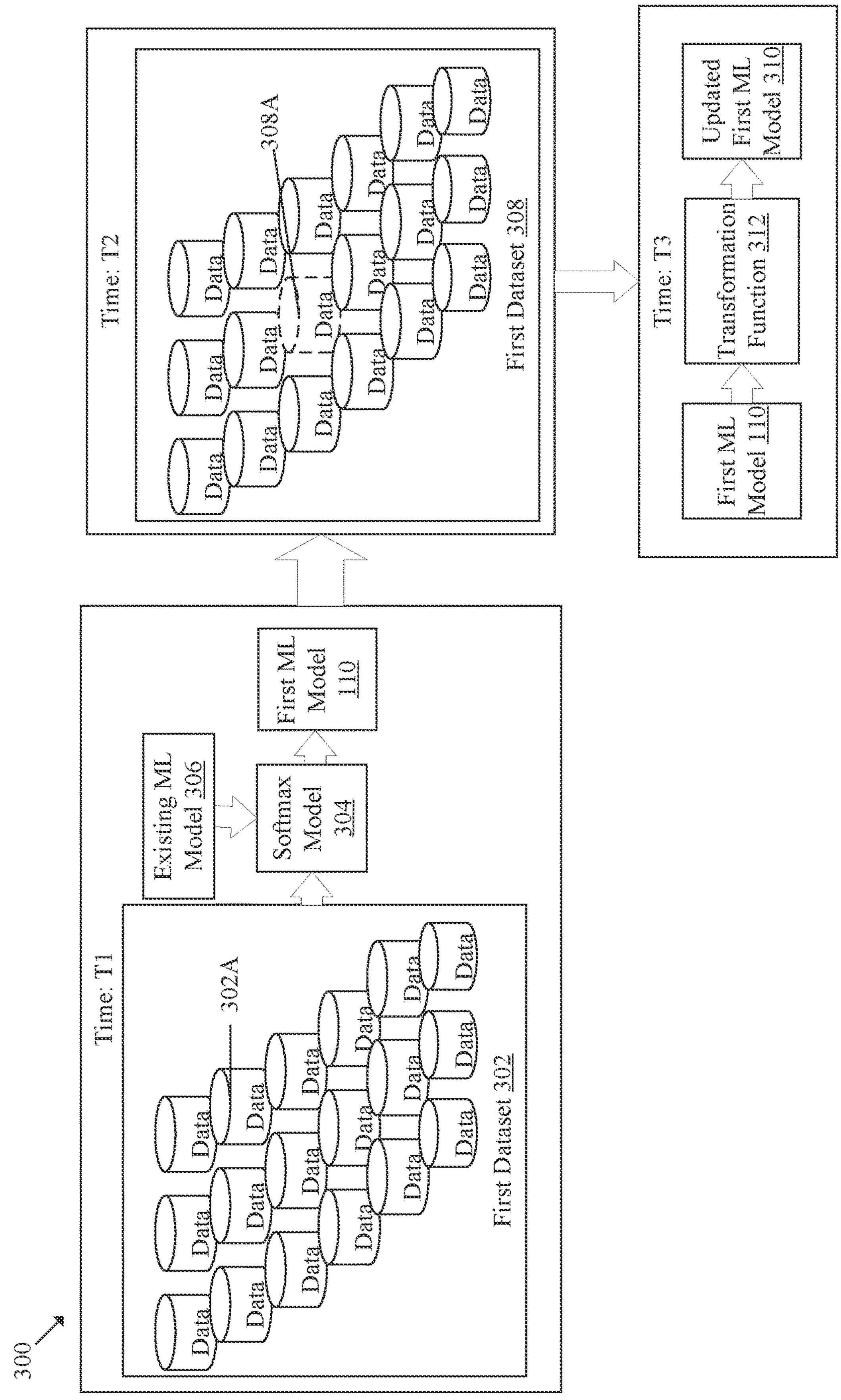
FIG. 3 is a diagram that illustrates an exemplary scenario for implementation of machine learning model update based on dataset or feature unlearning, in accordance with an embodiment of the disclosure.

FIG. 3 is a diagram that illustrates an exemplary scenario for implementation of machine learning model update based on dataset or feature unlearning, in accordance with an embodiment of the disclosure. FIG. 3 is described in conjunction with elements from FIG. 1 and FIG. 2. With reference to FIG. 3, there is shown an exemplary scenario 300. The scenario 300 may include a first dataset 302 including a dataset 302A, a Softmax model 304, an existing ML model 306, the first ML model 110, a first dataset 308 including a data subset 308A, an updated first ML model 310, and a transformation function 312. A set of operations associated the scenario 300 is described herein.

In the scenario 300 of FIG. 3, at a time instant T1, the first dataset 302 associated with the user 118 may be received. As shown, the first dataset 302 may include a plurality of datasets such as, the dataset 302A. The first dataset 302 may be received based on a collection of datapoints related to behavioral data associated with the user (such as, the user 118 of FIG. 1). For example, the behavioral data may correspond to a watch history or a rating scores of media content consumed by the user 118 on a media streaming platform. In another example, the behavior data may be purchase history or rating scores of products bought by the user 118 from an e-commerce portal. The first dataset 302 and the existing ML model 306 may be provided to a Softmax model 304. It may be appreciated that the Softmax model 304 may determine a probability for each class of a set of predefined classes in which a datapoint of the first dataset 302 may be classified. The Softmax model 304 may include a layer of neurons called as a Softmax layer to an output layer in the existing ML model 306. Based on the first dataset 302 and the application of the Softmax model 304, the first ML model 110 may be trained.

It may be noted that in the process of collection of the behavioral data of the user 118, as the first dataset 302, in various cases, erroneous or unwanted data may also get captured. For example, the user 118 may be in a sad mood and may watch tragedy movies on a certain day, however, generally, the user 118 may prefer comedy movies. So, the sad mood of the user 118 may be an anomaly with respect to the user 118 and the tragedy movies watched by the user 118 when the user 118 is sad may not be representative of a usual behavior of the user 118. Hence, information related to the tragedy movies may be unwanted data in the first dataset 302. In another example, the user 118 may lend the electronic device 102 to another person (such as, a friend or family member of the user 118). The other person may have varied interests than the user 118. Thus, the other person, to whom the electronic device 102 has been lent for a certain time, may watch movies of genres other than comedy (e.g., thrillers). Again, information related to such movies (e.g., thriller movies) may not represent the usual behavior of the user 118, and may be required to be removed as unwanted data.

The presence of such erroneous data in the first dataset 302 may lead the first ML model 110 to a faulty state. At a time instant "T2", the data subset 308A of the first dataset 308 may be determined as a faulty or erroneous dataset. In other words, it may be identified that previously used behavior data such as, the first dataset 308, may be erroneous and may lead the first ML model 110 to the faulty state. Since, the training of the first ML model 110 is based on the erroneous first dataset 308 (which may be included in the data subset 308A), the first ML model 110 may be a faulty model. Hence, the recommendations made by the first ML model 110 may not be optimum. The faulty state of the first ML model 110 may be needed to be transitioned to a non-faulty state to improve a prediction accuracy of the first ML model 110.

At a time instant "T3", the first ML model 110 may be updated based on an application of the transformation function 312 to obtain the updated first ML model 310. The updated first ML model 310 may unlearn certain features (for example, undesirable features) associated with the data subset 308A. The updated first ML model 310 may provide optimum recommendations, as compared to the first ML model 110. Details related to the transformation function 312 are further described, for example, in FIG. 8.

In an embodiment, the trained first machine learning model 110 may correspond to a recommendation model, and the updated first machine learning model 310 may be configured to output personalized recommendations, based on the received first user input. Prior to the update of the first machine learning model 110, the recommendation model may output the recommendations, based on the training of the first ML model 110 with the received first dataset 302. For example, the recommendation model may be a content-based recommendation model. It may be appreciated that every user associated with the content-based recommendation model may have certain personality traits. For example, some users may prefer to watch comedy videos, other users may prefer to watch action movies, another set of users may prefer to watch documentaries or news, and the like. Based on the personality traits of a particular user, the user may watch certain type or genre of videos more over others. Thus, based on the user behavior, the electronic device 102 may receive the first dataset 302, that may be used to train the first ML model 110, at the time instant "T1". The trained first ML model 110 may recommend videos to the user that may match his taste or preferences. For example, if the user prefers comedy videos than other genres of videos then, the trained first ML model 110 may recommend a set of comedy videos in a recommendation list. The user may then select a video that the user may wish to watch from the recommendation list. In some cases, the first dataset 302 may include one or more faulty datasets. For example, a user who prefers to watch comedy videos may lend the electronic device 102 to another person for a certain time duration during which the other person may watch action movies. Hence, after the particular time duration, the first dataset 302 may include the behavioral data related to the action movies. Since, the first ML model 110 is trained based on the first dataset 302, hence the first ML model 110 may be faulty and may recommend action videos to the user, while the user may still prefer comedy videos. At the time instant "T2", the data subset 308A may be determined as faulty based on the personalized recommendations made by the trained first ML model 110. At the time instant "T3", the first ML model 110 may be updated based on an application of the transformation function 312 to obtain the updated first ML model 310. The updated first ML model 310 may now recommend comedy videos over the action videos as recommendations to the user.

In an embodiment, the circuitry 202 may be further configured to receive a first user input indicative of a time duration associated with the data subset 308A, wherein the data subset 308A may be received based on the received first user input. In an example, the user 118 may receive recommendations and may realize that the personalized recommendations made by the trained first ML model 110 is faulty. The trained first ML model 110 may recommend action videos (over comedy videos), based on watch history of another person instead of the user 118. The user 118 may provide the first user input indicative of the time duration associated with the data subset 308A. For example, the user 118 may state that videos watched from a particular date/time to another date/time may be unwanted and information associated with such videos may correspond to the data subset 308A. The electronic device 102 may then extract videos watched during the aforesaid time duration and may update the first machine learning model 110 based on the received data subset 308A, to obtain the updated first ML model 310. Herein, the features associated with the received data subset 308A may be unlearnt by the first machine learning model 110. For example, the features associated with the received data subset 308A, that may be unlearnt may include a first feature, such as, a number of videos of a certain genre watched by the user 118, a length of the videos watched by the user 118, a type of genre watched by the user 118, a rating or review associated with the videos watched by the user 118, and so on. The updated first machine learning model 310 may be then configured to output personalized recommendations, based on the received first user input. For example, the updated first machine learning model 310 may now recommend comedy videos to the user, as the updated trained first machine learning model 310 may have unlearnt features associated with the received data subset 308A, based on the received first user input.

It should be noted that scenario 300 of FIG. 3 is for exemplary purposes and should not be construed to limit the scope of the disclosure.

Figure 4:
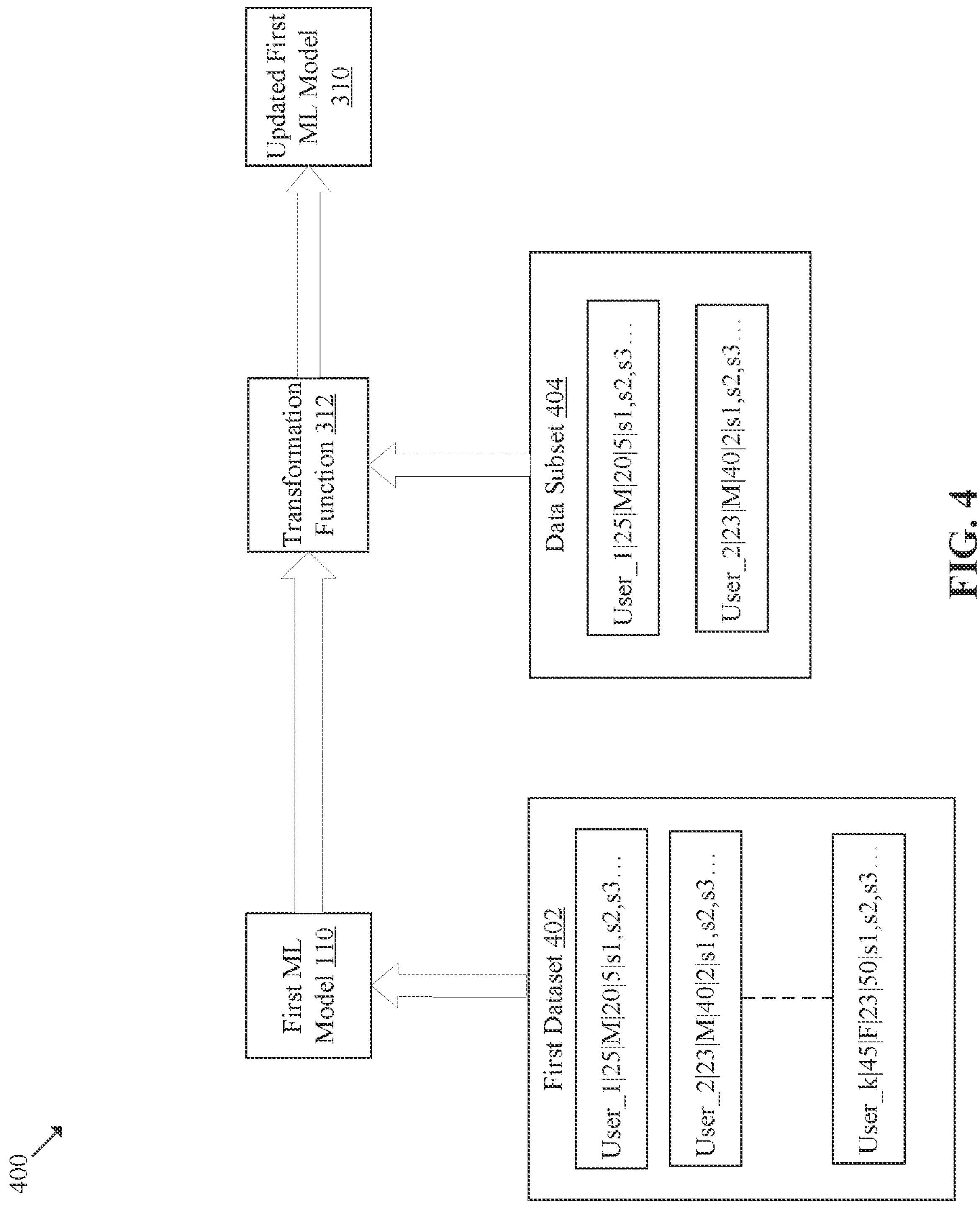
FIG. 4 is a diagram that illustrates an exemplary scenario for implementation of machine learning model update based on dataset or feature unlearning, in accordance with an embodiment of the disclosure.

FIG. 4 is a diagram that illustrates an exemplary scenario for implementation of machine learning model update based on dataset or feature unlearning, in accordance with an embodiment of the disclosure. FIG. 4 is described in conjunction with elements from FIG. 1, FIG. 2, and FIG. 3. With reference to FIG. 4, there is shown an exemplary scenario 400. The scenario 400 may include a first dataset 402, a data subset 404, the first ML model 110, the transformation function 312, and the updated first ML model 310. A set of operations associated the scenario 400 is described herein.

In the scenario 400 of FIG. 4, the first dataset 402 associated with the user (such as, the user 118 of FIG. 1) may be received. For example, the first dataset 402 may include a first datapoint (such as, "User_1|25|M|20|5|s1, s2, s3 . . . "), a second datapoint (such as, "User_2|23|M|40|2|s1, s2, s3 . . . "), . . . and a kth datapoint (such as, "User_k|45|F|23|50|s1, s2, s3 . . . "). The first dataset 402 may include features based on which the first ML model 110 may be trained. For example, the first datapoint such as, "User_1|25|M|20|5|s1, s2, s3 . . . ", may state that a male user with identification as "user_1" of age "25" may have interacted with items "s1, s2, s3, and so on". Based on the received first dataset 402, the first ML model 110 may be trained. Further, a dataset including the first datapoint (i.e., "User_1|25|M|20|5|s1, s2, s3 . . . ") and the second datapoint (i.e., "User_2|23|M|40|2|s1, s2, s3 . . . ") may be received as the data subset 404. The features associated with the data subset 404 may be required to be unlearnt. The first ML model 110 along with the data subset 404 may be applied to the transformation function 312 to obtain the updated first ML model 310. The updated first ML model 310 may be obtained based on unlearning of features associated with the data subset 404 by the first ML model 110. Details related to the transformation function 312 are further described, for example, in FIG. 8.

It should be noted that scenario 400 of FIG. 4 is for exemplary purposes and should not be construed to limit the scope of the disclosure.

Figure 5:
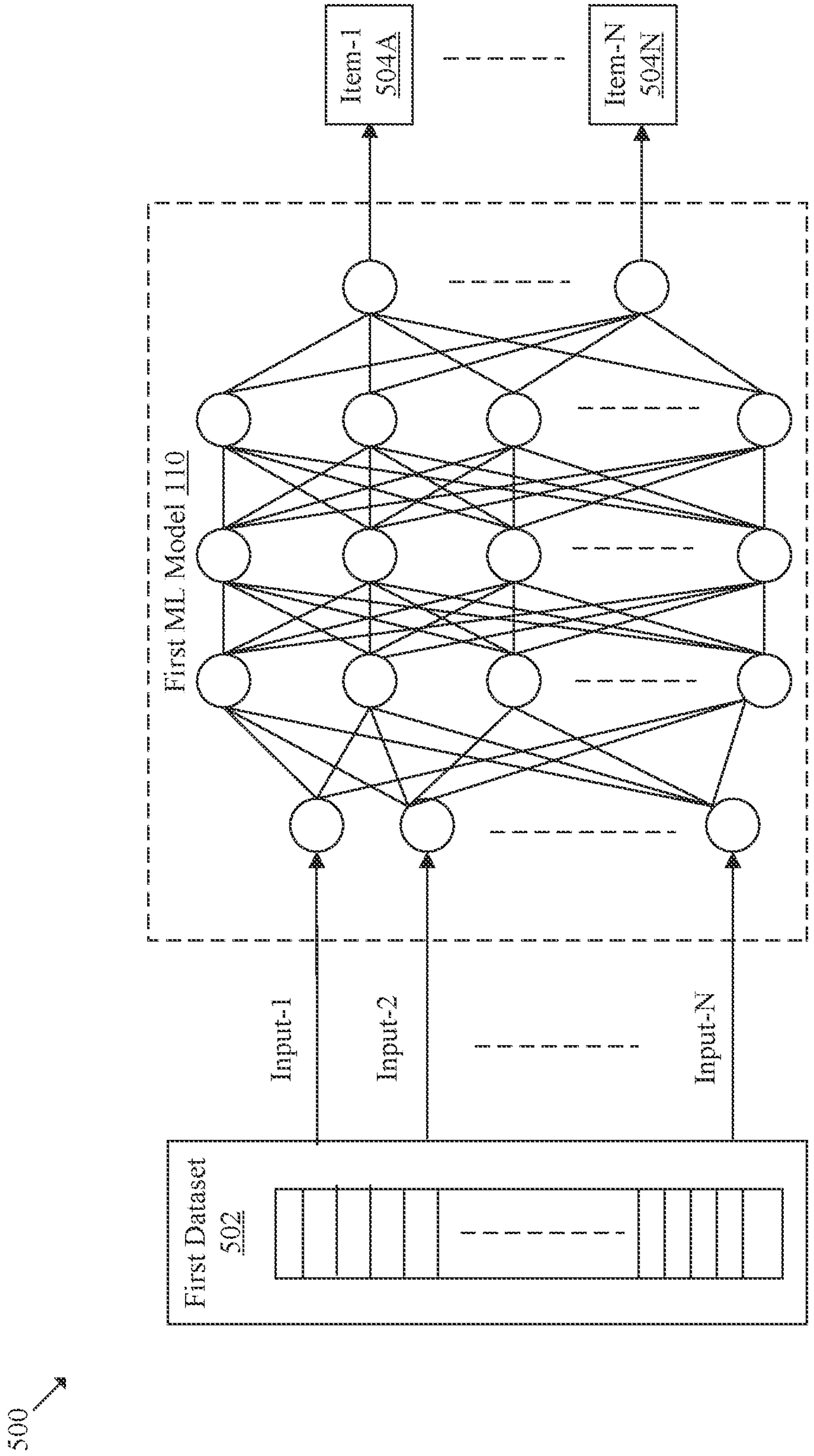
FIG. 5 is a diagram that illustrates an exemplary scenario for training a first machine learning model, in accordance with an embodiment of the disclosure.

FIG. 5 is a diagram that illustrates an exemplary scenario for training of a first machine learning model, in accordance with an embodiment of the disclosure. FIG. 5 is described in conjunction with elements from FIG. 1, FIG. 2, FIG. 3, and FIG. 4. With reference to FIG. 5, there is shown an exemplary scenario 500. The scenario 500 may include a first dataset 502, the first ML model 110, and an output 504. The output 504 may include N number of items such as, an item-1 504A, . . . and an item-N 504N. A set of operations associated the scenario 500 is described herein.

The N number of inputs and items shown in FIG. 5 are presented merely as an example. The output 504 may include only one or more than N inputs and items, without deviation from the scope of the disclosure. For the sake of brevity, only N inputs and items have been shown in FIG. 5. However, in some embodiments, there may be more than inputs and N items, without limiting the scope of the disclosure.

In the scenario 500 of FIG. 5, the first dataset 502 may be received. The first dataset 502 may include one or more features such as, but not limited to, a first feature comprising an identification of a user (e.g., the user 118), a second feature indicative of an age of the user, a third feature indicative of a gender of the user, a fourth indicative of a watch time of the user, a fifth feature indicative of an inactive time since last watch, and a sixth feature indicative of a watching history of the user. Each of the features may be provided as an input to an input layer of the first ML model 110. The first ML model 110 may be trained based on the received first dataset 502 and may make recommendations including N items such as, the item-1 504A, . . . and the item-N 504N. In an example, the trained first ML model 110 may output a first item as an identification of the recommended video, a second item as a title of the recommended video, a third item as a video length of the recommended video, a fourth item as a genre of the recommended video, a fifth item as a language of the recommended video, and a sixth item as a category such as, a show or a movie of the recommended video.

It should be noted that scenario 500 of FIG. 5 is for exemplary purposes and should not be construed to limit the scope of the disclosure.

Figure 6:
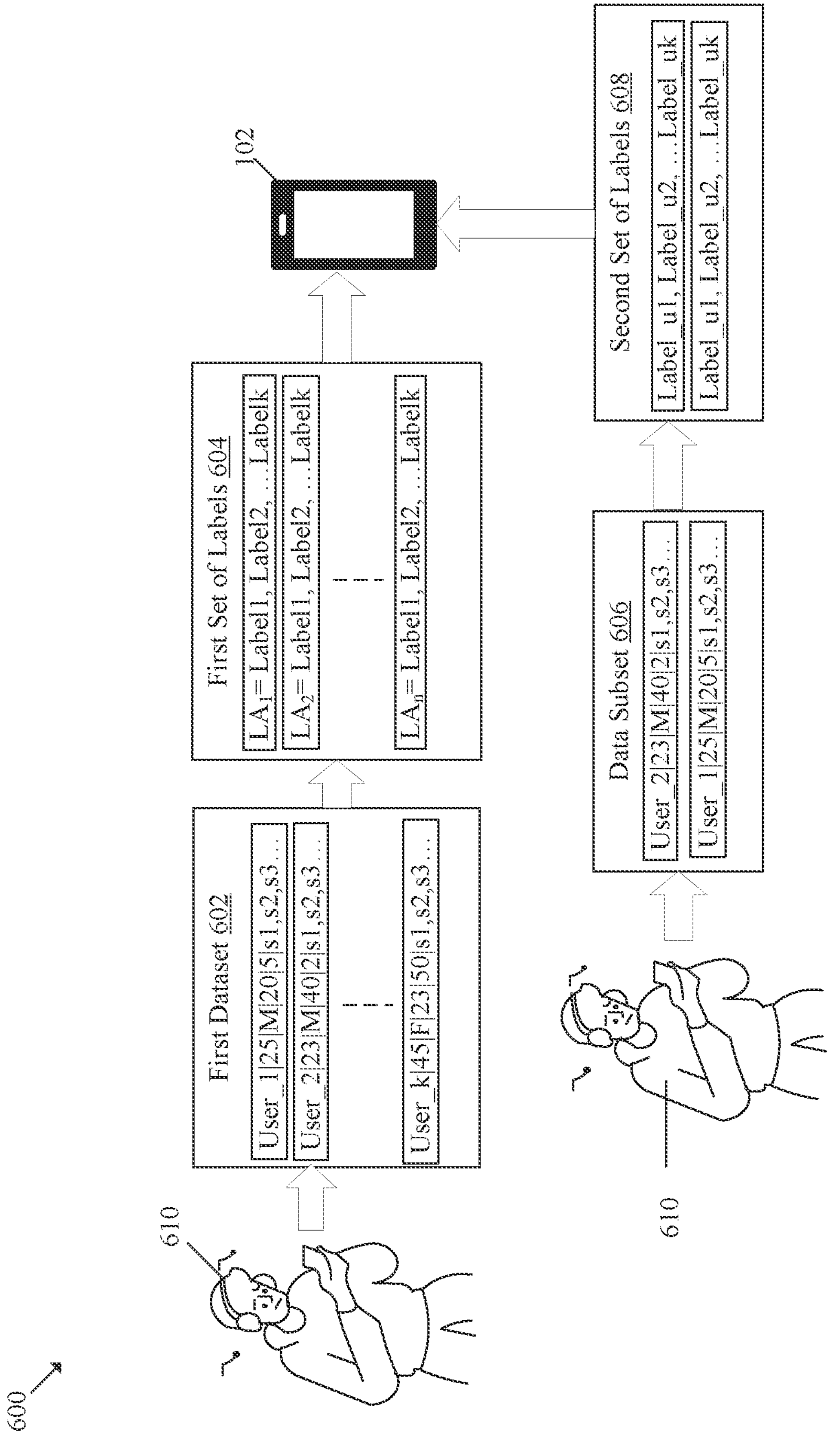
FIG. 6 is a diagram that illustrates an exemplary scenario for machine learning model update based on dataset or feature unlearning, in accordance with an embodiment of the disclosure.

FIG. 6 is a diagram that illustrates an exemplary scenario for machine learning model update based on dataset or feature unlearning, in accordance with an embodiment of the disclosure. FIG. 6 is described in conjunction with elements from FIG. 1, FIG. 2, FIG. 3, FIG. 4, and FIG. 5. With reference to FIG. 6, there is shown an exemplary scenario 600. The scenario 600 may include a first dataset 602, a first set of labels 604, a data subset 606, and a second set of labels 608. The scenario 600 further shows a user 610. A set of operations associated the scenario 600 is described herein.

In an embodiment, the circuitry 202 may be further configured to extract the second set of labels 608 associated with the received data subset 606. The circuitry 202 may be further configured to extract the first set of labels 604 associated with the received first dataset 602. The circuitry 202 may be further configured to remove the extracted second set of labels 608 associated with the data subset 606 from the extracted first set of labels 604 associated with the received first dataset 602. The circuitry 202 may be further configured to determine a third set of labels based on the removal of the extracted second set of labels 608 (associated with the data subset 606) from the extracted first set of labels 604 associated with the received first dataset 602.

It may be appreciated that labels may provide meaningful context to a given dataset, so that a given machine learning model may learn from the labels. For example, if a given dataset include images, labels of the images may indicate an animal such as, a cat present in the images. In other words, labels may correspond to an object (or a class) that a given machine learning model may be configured to identify (or classify) for a given input datapoint. For example, in a case which an input datapoint such as, "User_1|25|M|20|5|s1, s2, s3 . . . ", is provided to the first ML model 110, the first ML model 110 may output predictions, such as, a video file including a set of items as "Vid_17, ABC, large, drama, English, and show". In such case, "Vid_17" may be the identification of the video, "ABC" may be the title of the video, "large" may be the video length, "drama" may be the genre, "English" may be the language, and "show" may be the category of the video file predicted by the first ML model 110, based on the provided input datapoint. Each item of the set of items of the predicted video file may correspond to a label. In current example, "Vid_17" may correspond to a first label, "ABC" may correspond to a second label, "large" may correspond to a third label, "drama" may correspond to a fourth label, "English" may correspond to a fifth label, and "show" may correspond to a sixth label. In order to train a given machine learning model, the training dataset along with respective labels may be used.

In the scenario 600 of FIG. 6, the behavioral data associated with the user 610 may be received as the first dataset 602. The acquisition of the behavioral data may lead towards development of a recommendation model through training of the first machine learning model 110. In the scenario 600, the first dataset 602 may include the datapoints such as, a first datapoint (e.g., "User_1|25|M|20|5|s1, s2, s3 . . . "), a second datapoint (e.g., "User_2|23|M|40|2|s1, s2, s3 . . . "), . . . and a kth datapoint (e.g., "User_k|45|F|23|50|s1, s2, s3 . . . "). The circuitry 202 may extract the first set of labels 604 associated with the received first dataset 602. In the scenario 600, the extracted first set of labels 604 associated with the received first dataset 602 may include an aggregated label "$LA_1$" as "Label1, Label2, . . . Labelk" corresponding to the first datapoint, an aggregated label "$LA_2$" as "Label1, Label2, . . . Labelk" corresponding to the second datapoint, . . . and an aggregated label "$LA_n$" as "Label1, Label2, . . . Labelk" corresponding to the kth datapoint. The extracted first set of labels 604 along with the received first dataset 602 may be used by the electronic device 102 to train the first ML model 110 (not shown in FIG. 6).

The user 610 may realize that certain recommendations made by the first ML model 110 may not be optimum. This may be due to the inclusion of a dataset (including one or more datapoints) in the first dataset 602 that may not correspond to the user 610 and may lead to faulty training of the first ML model 110. For example, the user 610 may lend the electronic device 102 to a friend who may watch certain videos, such as, news, sports, and the like, which may not be relevant to the user 610. However, since the electronic device 102 may continuously receive the behavioral data, the first ML model 110 may be also re-trained based on the behavioral data associated with the friend of the user 610. Hence, the re-trained first ML model 110 may recommend videos related to topics, such as, news, sports, and the like, which may not be relevant to the user 610. In another example, the user 610 may watch certain videos such as, a gloomy video, during a certain time period due to unexpected events happening in life of the user 610. However, the user 610 may not prefer to watch such videos (like gloomy videos) again. The first ML model 110 may recommend videos similar to the gloomy video, based on the updated watch history of the user 610. In order to mitigate the aforesaid issues, the user 610 may trigger a request to enable the first ML model 110 to unlearn data acquired between two specified time stamps. In such case, the user 610 may provide the first user input indicative of the time duration in which the data subset (e.g., the data subset 606) may be received. For example, the user 610 may provide an input that may indicate that between a time duration from 6 A.M. to 12 P.M of a certain day, the user 610 watched the gloomy videos and that the user 610 may not wish to watch such videos again. The corresponding user behavioral data (e.g., watch history of the user 610 associated with the particular time period) may be needed to be unlearnt by the first ML model 110. For example, the electronic device 102 may provide a user interface elements such as, dialogue boxes, drop down menus, a date-time picker, and the like, through the display device 210 of the electronic device 102 to receive the first user input. Based on the received first user input, the data subset 606 may be received. In the scenario 600, the data subset 606 including datapoints, such as, the second datapoint (e.g., "User_2|23|M|40|2|s1, s2, s3 . . . ") and the first datapoint (e.g., "User_1|25|M|20|5|s1, s2, s3 . . . ") may be received. The second set of labels 608 associated with the received data subset 606 may be extracted. In the scenario 600, the second set of labels 608 associated with the received data subset 606 may include "Label_u1, Label_u2, . . . Label_uk" associated with the second datapoint and "Label_u1, Label_u2, . . . Label_uk" associated with the first datapoint. The second set of labels 606 along with the with the received data subset 606 may be used to train the second ML model 112 that may update the first ML model 110, based on an application of the transformation function (such as, the transformation function 312 of FIG. 3). The determination of the labels for the update of the first ML model 110 is described further, for example, in FIG. 7.

It should be noted that scenario 600 of FIG. 6 is for exemplary purposes and should not be construed to limit the scope of the disclosure.

Figure 7:
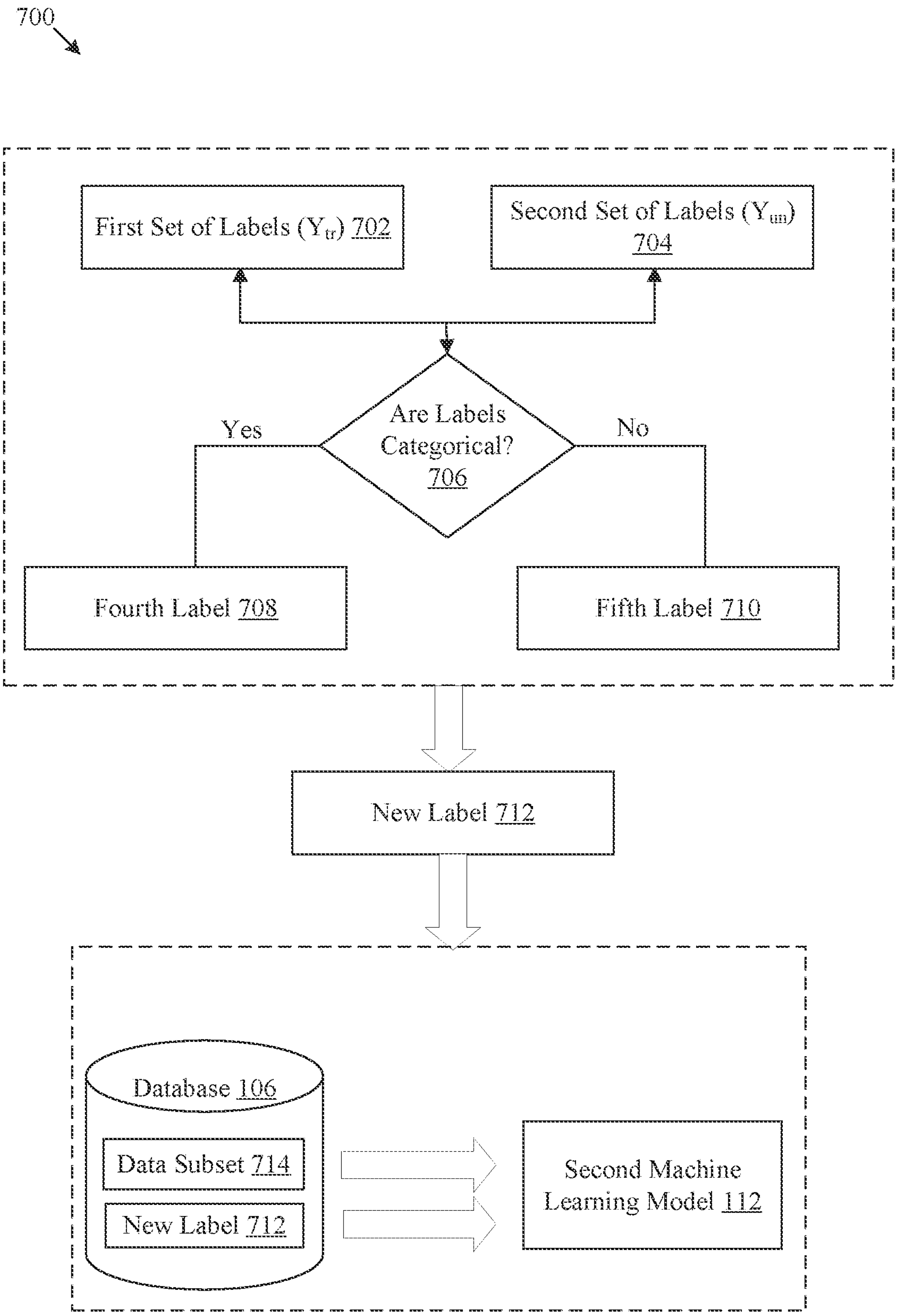
FIG. 7 is a diagram that illustrates an exemplary scenario for determination of labels, in accordance with an embodiment of the disclosure.

FIG. 7 is a diagram that illustrates an exemplary scenario for determination of labels, in accordance with an embodiment of the disclosure. FIG. 7 is described in conjunction with elements from FIG. 1, FIG. 2, FIG. 3, FIG. 4, FIG. 5, and FIG. 6. With reference to FIG. 7, there is shown an exemplary scenario 700. The scenario 700 may include a first set of labels 702, a second set of labels 704, a fourth label 708, a fifth label 710, a new label 712, the database 106, and the second machine learning model 112. The database 106 may include the new label 712 and a data subset 714. The scenario 700 further illustrates an exemplary operation 706. A set of operations associated the scenario 700 is described herein.

In the scenario 700 of FIG. 7, the circuitry 202 may be configured to extract the second set of labels ($Y_{un}$) 704 associated with the received data subset (such as, the received data subset 606 of FIG. 6). As discussed, the second set of labels 704 may provide meaningful context to the received data subset (not shown) so that the second ML model (such as, the second ML model 112 of FIG. 1) may learn from the second set of labels 704. It may be noted that the extracted second set of labels ($Y_{un}$) 704 may be also called unlearning set of labels as such labels may be needed to be unlearnt by the first ML model 110. Details related to the extraction of the second set of labels 704 are further described, for example, in FIG. 6.

The circuitry 202 may be configured to extract the first set of labels ($Y_{Tr}$) 702 associated with the received first dataset (such as, the received first dataset 602 of FIG. 6). The first set of labels 702 may provide meaningful context to the received first dataset (not shown) so that the first ML model 110 may learn from the first set of labels 702. It may be noted that the extracted first set of labels ($Y_{Tr}$) 702 may be also called a training set of labels as they may be used to train the first ML model 110. Details related to the extraction of the first set of labels 702 are further described, for example, in FIG. 6.

The circuitry 202 may be configured to remove the extracted second set of labels 704 (associated with the data subset 606) from the extracted first set of labels 702 (associated with the received first dataset 602). The circuitry 202 may be further configured to determine a third set of labels based on the removal of the extracted second set of labels 704 (associated with the data subset 606) from the extracted second set of labels 704 (associated with the received first dataset 602). The extracted second set of labels 704 may be removed based on an equation (1):

$$Y''_{Un} = Y_{Tr} - Y_{Un} \quad (1)$$

where $$“Y''_{Un}”$$

may represent the third set of labels,

“$Y_{Tr}$” may represent the extracted first set of labels 702, and

“$Y_{Un}$” may represent the extracted second set of labels 704.

Herein, the extracted second set of labels 704 may be removed from the extracted first set of labels 702 so that the determined third set of labels may exclude the extracted second set of labels 704.

In an embodiment, the circuitry 202 may be further configured to determine whether each label of the determined third set of labels corresponds to a categorical label, as described further, for example, at 706. The circuitry 202 may be further configured to determine a count of the determined third set of labels based on the determination that each of the determined third set of labels corresponds to the categorical label. The circuitry 202 may be further configured to determine the fourth label 708 based on the determined count of the determined third set of labels. The fourth label 708 may correspond to a maximum count in the determined third set of labels, and the second machine learning model 112 (not shown) may be further trained based on the determined fourth label 708.

For example, in the scenario 700 of FIG. 7, at 706, the circuitry 202 may determine a category of the determined third set of labels. In an embodiment, the circuitry 202 may determine whether each of the third set of labels $$(Y''_{Un})$$

is categorical or not. It may be appreciated that in a case where the determined third set of labels is categorical, a value of the determined third set of labels may be discrete such as, “yes”, or “no”, (or “0”, or “1”).

In a case where each of the extracted second set of labels 704 and the extracted first set of labels 702 or the determined third set of labels are categorical, the count of the determined third set of labels may be determined. The label with the maximum count in the determined third set of labels may be determined as the fourth label 708.

The circuitry 202 may determine the fourth label 708 based on the determined count of the determined third set of labels. The fourth label 708 may correspond to the maximum count in the determined third set of labels, and the second machine learning model 112 (not shown) may be further trained based on the determined fourth label 708. The fourth label 708 may be determined according to an equation (2)

$$Y'_{Un} = \mathrm{Max}(Y_{Tr} - Y_{Un}) \tag{2}$$

where, $$“Y'_{Un}”$$

may represent the determined fourth label 708,

“$Y_{Tr}$” may represent the first set of labels 702, and

“$Y_{un}$” may represent the second set of labels 704.

As evident from the equation (1), the difference between the first set of labels ($Y_{Tr}$) 702 and the second set of labels ($Y_{Un}$) 704 may be determined as the third set of labels. Thus, based on the equations (1) and (2), the label having the maximum count in the third set of labels may be determined as the fourth label 708. In a case where, the determined category of the determined third set of labels is categorical, the determined fourth label 708 may be taken as the new label 712. However, in some cases, the determined category of the determined third set of labels may be numerical.

In an embodiment, the circuitry 202 may be further configured to determine whether each label of the determined third set of labels corresponds to a numerical label or not. The circuitry 202 may be further configured to determine a mean of the determined third set of labels, based on the determination that each of the determined third set of labels corresponds to the numerical label. The circuitry 202 may be further configured to determine the fifth label 710 based on the determined mean of the determined third set of labels. The second machine learning model 112 may be further trained based on the determined fifth label 710.

For example, in the scenario 700 of FIG. 7, at 706, the circuitry 202 may determine the category of the determined third set of labels. In an embodiment, of the circuitry 202 may determine whether the third set of labels $$Y''_{Un}$$

is numerical or not. It may be appreciated that incase the determined third set of labels is non categorical or numerical, then output for the determined third set of labels may be a non-discrete or continuous value, such as, 0.1, 0.11, 0.123, 5.893, and the like. In a case where the determined third set of labels $$(Y''_{Un})$$

is numerical, the mean of the determined third set of labels may be determined to determine the fifth label 710 that may be assigned as the new label 712. The fifth label 710 may be determined according to the following equation (3):

$$Y'_{un} = \frac{1}{n}\sum_{i=1}^{n}(Y_{Tr} - Y_{Un})[i] \tag{3}$$

where $$“Y'_{Un}”$$

may represent the determined fifth label 710,

“$Y_{Tr}$” may represent the extracted first set of labels 702,

“$Y_{Un}$” may represent the extracted second set of labels 704, and

“n” may represent a total number of labels present in the third set of labels.

In a case where the determined category of the determined third set of labels is numerical, the determined fifth label 710 may be taken as the new label 712. The determined new label 712 and the received data subset 714 may be used to train the second ML model 112. The second ML model 112 may be further used to update the first ML model 110, based on the transformation function (such as, the transformation function 312 of FIG. 3). The first ML model 110 may be updated such that for the received data subset 714, the updated first ML model 110 may output the new label 712. Details related to the transformation function are further described, for example, in FIG. 8.

It should be noted that scenario 700 of FIG. 7 is for exemplary purposes and should not be construed to limit the scope of the disclosure.

Figure 8:
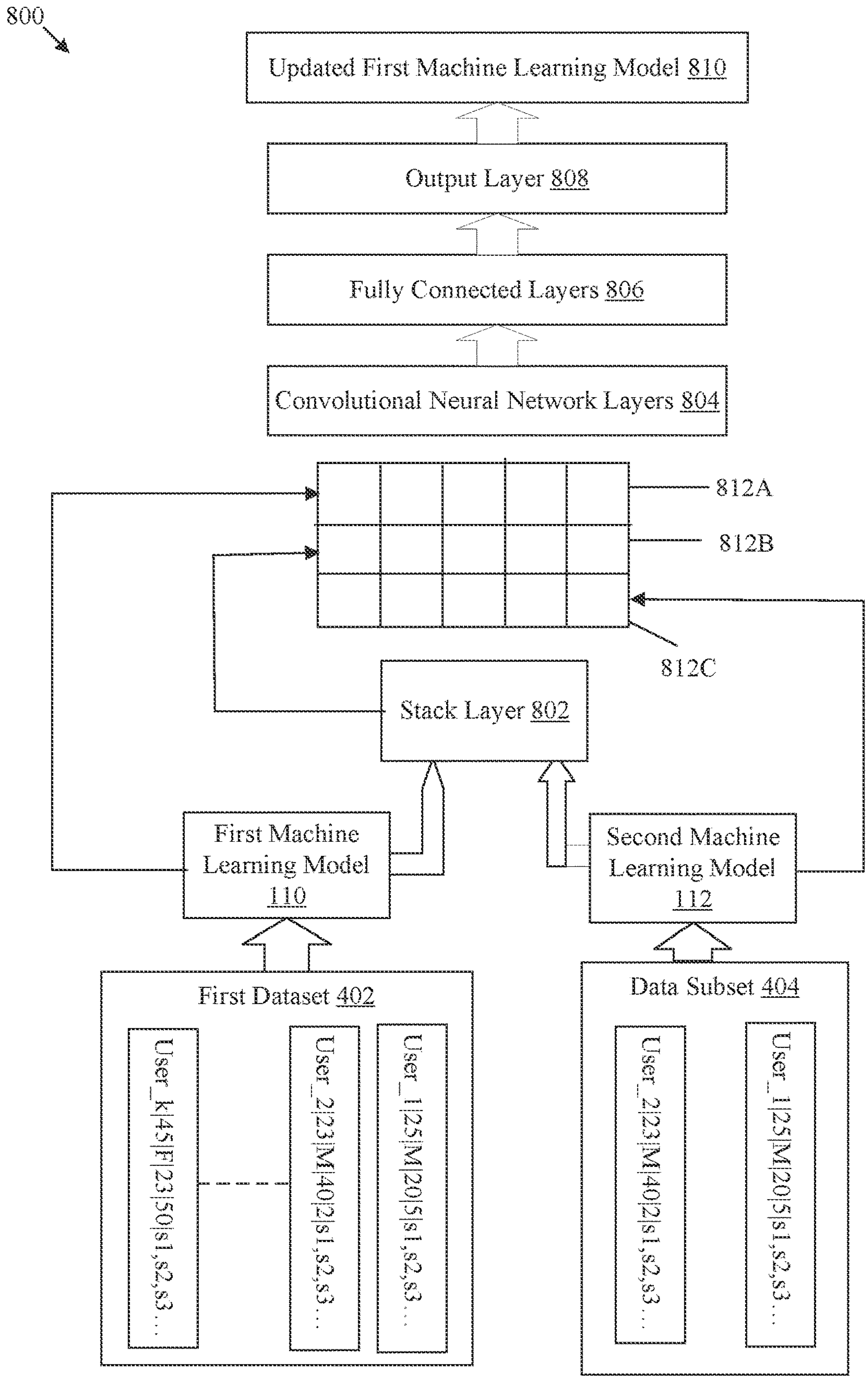
FIG. 8 is a diagram that illustrates an exemplary scenario for updating the first ML model based on an application of a transformation function, in accordance with an embodiment of the disclosure.

FIG. 8 is a diagram that illustrates an exemplary scenario for update of the first ML model based on an application of a transformation function, in accordance with an embodiment of the disclosure. FIG. 8 is described in conjunction with elements from FIG. 1, FIG. 2, FIG. 3, FIG. 4, FIG. 5, FIG. 6, and FIG. 7. With reference to FIG. 8, there is shown an exemplary scenario 800. The scenario 800 may include the first dataset 402, the data subset 404, the first ML model 110, the second ML model 112, a stack layer 802, convolutional neural network (CNN) layers 804, fully connected (FC) layers 806, an output layer 808, and an updated first ML model 810. The scenario 800 further illustrates a matrix 812 including a first row 812A, a second row 812B, and a third row 812C. A set of operations associated the scenario 800 is described herein.

In the scenario 800 of FIG. 8, the first dataset 402 associated with the user such as, the user 118, may be received. Details related to the first dataset 402 are further described, for example, in FIG. 4. Based on the received first dataset 402, the first ML model 110 may be trained. Further, the data subset 404 may be received. The second ML model 112 may be trained, based on the data subset 404. Details related to the data subset 404 are further described, for example, in FIG. 4. The transformation function may be applied on the trained first machine learning model 110 and on the trained second machine learning model 112.

In an embodiment, the circuitry 202 may be further configured to construct the stack layer 802 associated with the transformation function. The stack layer 802 may be configured to stack the trained first machine learning model 110 and the trained second machine learning model 112 to update the trained first machine learning model 110. In other words, the circuitry 202 may stack the trained first machine learning model 110 with the trained second machine learning model 112 using the stack layer 802 as an intermediate layer between the trained first machine learning model 110 and the trained second machine learning model 112. In an embodiment, the transformation function may include the constructed stack layer 802 and a set of deep neural network (DNN) layers.

In the scenario 800 of FIG. 8, the trained first machine learning model 110 with the trained second machine learning model 112 may be stacked using the stack layer 802, such that the trained first machine learning model 110 may form the first row 812A of the matrix 812. The trained second machine learning model 112 may form the third row 812C of the matrix 812. The stack layer 802 may be the second row 812B of the matrix 812, that may lie between the first row 812A and the third row 812C. In an embodiment, weights associated with the trained first machine learning model 110 may be stored the first row 812A while weights associated with the trained second machine learning model 112 may be stored the third row 812C. Based on the application of the stack layer 802, the transformation function may be applied on the trained first machine learning model 110 using the trained second machine learning model 112.

In an embodiment, the transformation function may correspond to a dot product of a first output of the trained first machine learning model 110 with a second output of the trained second machine learning model 112. The stack layer 802 may determine an element-wise product interaction between the first output of the trained first machine learning model 110 and the second output of the trained second machine learning model 112 to update the trained first machine learning model 110.

In an embodiment, the transformation function may further correspond to a normalization of the dot product based on the first output. That is, the determined element-wise product interaction may be divided by a modulus of the first output of the trained first machine learning model 110. In other words, the transformation function may be determined according to the following equation (4):

$$O_{dot} = \frac{\Phi(x) \odot \psi(x)}{\|\Phi(x)\| + \epsilon} \tag{4}$$

where, "$O_{dot}$" may represent the transformation function,

"$\phi(x)$" may represent the first output of the trained first machine learning model 110, "$\psi(x)$" may represent the second output of the trained second machine learning model 112, and "$\epsilon$" may be a parameter to avoid erroneous result when the modulus of the transformation function of the trained first machine learning model 110 is "0" or a very small value close to "0".

In the scenario 800 of FIG. 8, after the application of the stack layer 802, the CNN layers 804 and the FC layers 806 may be applied. It may be appreciated that the CNN layers 804 may include an input layer, one or more hidden layers, and an output layer. Thus, the stacked output of both the trained first ML model 110 and the trained second ML model 112 may be fed to the CNN layers 804 for feature extraction from both the models. The attributes or features which may be a cause for over-generalization of the performance of the trained first ML model 110 may thus, be unlearned from the trained first ML model 110. However, contrary to typical neural networks, each neuron of the input layer (of the CNN layers 804) may not be connected to neurons in the one or more hidden layers (of the CNN layers 804). Only the neurons in a local receptive field may be connected to the hidden layer. Feature mapping may be created based on convolutional operations. The output of the CNN layers 804 may be fed to the input of the FC layers 806. It may be appreciated that the FC layers 806 may be a simple feed forward neural network. The CNN layers 804 may be used as features of spatial data, which may be extracted efficiently. The output of the CNN layers 804 may be connected (via the FC layers 806) to the output layer 808 to obtain the updated first ML model 810.

The updated first ML model 810 may have unlearnt at least one of the data subset 404 or a set of features associated with the second machine learning model 112. Thus, the updated first ML model 810 may make recommendations more accurately than the first ML model 110, prior to the update. For example, a first user (such as, the user 118 of FIG. 1) may lend the electronic device 102 or a video streaming account to a second user to enable the second user to watch videos for a certain period of time. The second user may watch sports videos; however, such sports videos may not be of interest to the first user. However, the first ML model 110 may learn behavioral data continuously and start to make recommendations related to sports videos for the first user. Eventually, the first user may lose interest in the recommendations and may provide the first user input indicative of the time duration during which the second user may have watched sports videos. The data subset 404 may be received based on the received first user input and the second ML model 112 may be trained. Further, the transformation function may be applied on the trained first machine learning model 110 and on the trained second machine learning model 112 to obtain the updated first machine learning model 810. Based on the update of the first ML model 110, the first ML model 110 may unlearn to the data subset 404 related to the sports videos and/or unlearn a set of features (e.g., a feature related to video type as sports/games videos) associated with the sports videos. The updated first machine learning model 810 may now make recommendations that may be more relevant to the first user. Thus, attributes of the trained second machine learning model 112 (which may be also called as the unlearnable model), which may be set for over-generalized performance, may help to unlearn the unwanted data from trained first machine learning model 110.

It should be noted that scenario 800 of FIG. 8 is for exemplary purposes and should not be construed to limit the scope of the disclosure.

Figure 9:
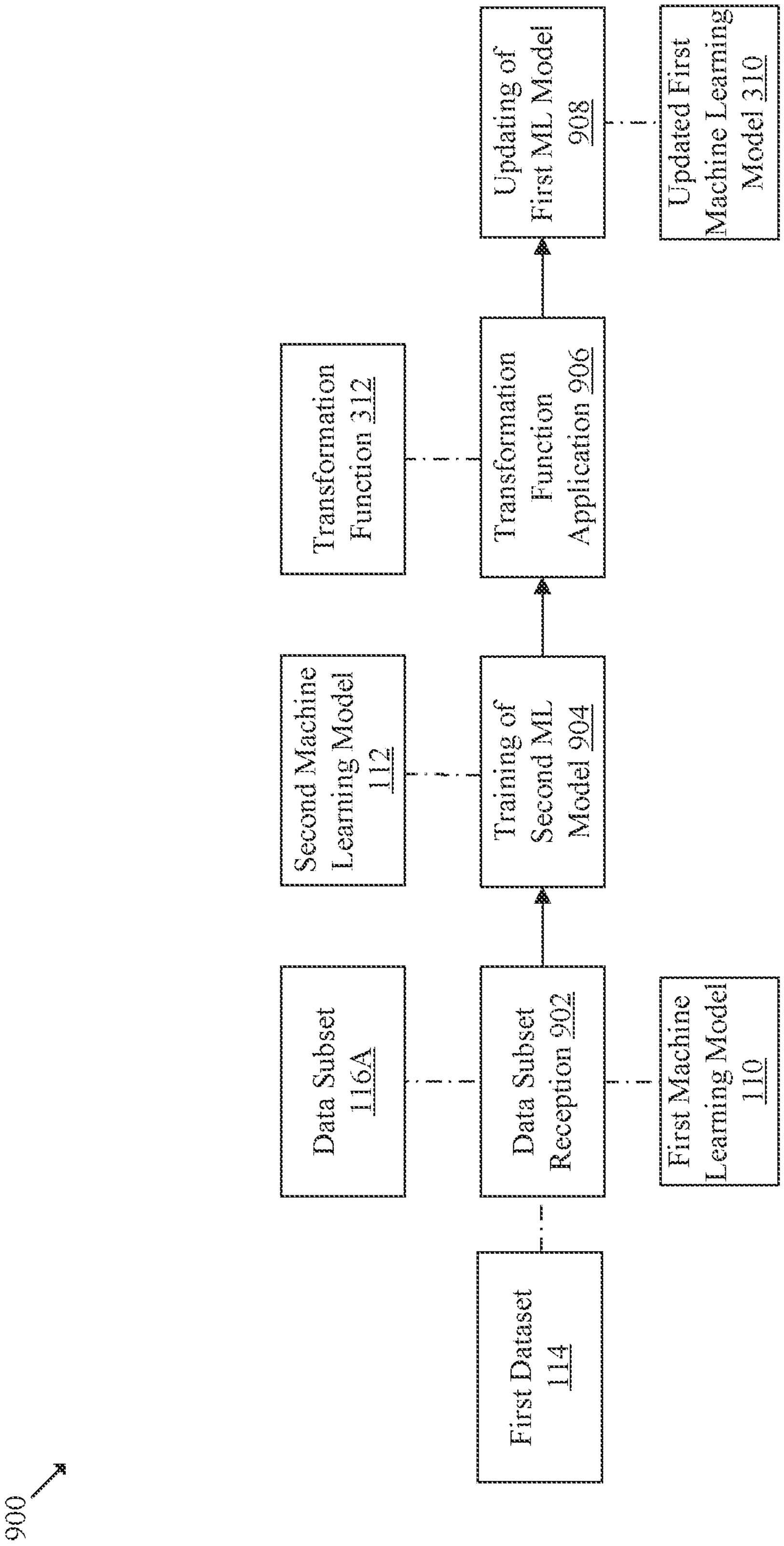
FIG. 9 is a diagram that illustrates an exemplary processing pipeline for implementation of machine learning model update based on dataset or feature unlearning, in accordance with an embodiment of the disclosure.

FIG. 9 is a diagram that illustrates an exemplary processing pipeline for implementation of machine learning model update based on dataset or feature unlearning, in accordance with an embodiment of the disclosure. FIG. 9 is explained in conjunction with elements from FIG. 1, FIG. 2, FIG. 3, FIG. 4, FIG. 5, FIG. 6, FIG. 7, and FIG. 8. With reference to FIG. 9, there is shown an exemplary processing pipeline 900 that illustrates exemplary operations from 902 to 908 for implementation of machine learning model update based on dataset or feature unlearning. The exemplary operations 902 to 908 may be executed by any computing system, for example, by the electronic device 102 of FIG. 1 or by the circuitry 202 of FIG. 2. The exemplary processing pipeline 900 further illustrates the first ML model 110, the second ML model 112, the first dataset 114, the data subset 116A, the updated first ML model 310, and the transformation function 312.

At 902, an operation for data subset reception may be executed. The circuitry 202 may be configured to receive the data subset 116A of the first dataset 114 associated with the user (such as, the user 118 of FIG. 1), wherein the first machine learning model 110 may be trained based on the first dataset 114 associated with the user. The first dataset 114 associated with the user 118 may be the behavioral data associated with the user 118. The behavioral data associated with the user 118 over a period of time may be collected and received as the first dataset 114. The first machine learning model 110 may be trained based on the first dataset 114 associated with the user 118. The first dataset 114 may include plurality of datasets 116. However, in some cases one or more datasets of the plurality of datasets 116 may not be related to the user 118. Such datasets that may not be associated with the user 118 may be called as the data subset 116A. As, the first machine learning model 110 may be trained based on the first dataset 114, the first ML model 110 may also make recommendations based on the data subset 116A. In an embodiment, the first machine learning model 110 may be a recommendation model. Details related to the first ML model 110 are further described, for example, in FIG. 3.

In an embodiment, the circuitry 202 may be further configured to receive the first user input indicative of the time duration, wherein the data subset 116A is received based on the received first user input. For example, the time duration may be in terms of a date or a time interval, and the like, during which the electronic device 102 may have collected the data subset 116A. For example, once the user 118 realizes that there may be a need to unlearn certain data, the user 118 may specify the certain dates or time intervals to select data that may be unlearnt. In an example, a User Masterfile may be invoked from the server 104 to fetch for specified data to be unlearned (also referred herein as "unlearn data"). The circuitry 202 may extract the specified "unlearn data" between the aforesaid time interval, as the data subset 116A. Details related to the first user input are further described, for example, in FIG. 3.

In an embodiment, the circuitry 202 may be further configured to compare an output of the trained first machine learning model 110 with a threshold. The circuitry 202 may be further configured to determine the output as faulty based on the comparison of the output of the trained first machine learning model 110 with the threshold. The circuitry 202 may be further configured to transmit a notification based on the determination that the output is faulty. The circuitry 202 may be further configured to receive a second user input based on the transmitted notification indicative of the faulty output, wherein the data subset 116A may be received based on the second user input. Herein, the threshold may be a minimum value of a parameter used for evaluation of a performance (e.g., an accuracy, a precision, a recall, or an f-score) of the first ML model 110.

The circuitry 202 may be further configured to determine the output as faulty based on the comparison of the output of the trained first machine learning model 110 with the threshold. Examples of the parameters that may be used for evaluation of the performance of the first ML model 110 include, but are not limited to, a confusion matrix, an F1-score, an accuracy, a precision, a sensitivity, and a specificity. The first ML model 110 may be considered acceptable for recommendations when a measured parameter of the first ML model 110 is less than the threshold.

The circuitry 202 may be further configured to transmit a notification to alert the user 118 based on the determination that the output is faulty. In a case where the output of the trained first machine learning model 110 is below the threshold, the output of the first ML model 110 may be determined as faulty. In such a case, the output such as, recommendations made by the first ML model 110, may not be optimum. The user 118 may be notified that the output of the first ML model 110 is faulty. The notification may be a popup notification displayed on a display (such as, the display device 210 of FIG. 2) of the electronic device 102. In an example, the notification may be provided to the user 118 based on haptic feedback. For example, the electronic device 102 may vibrate to indicate that the output of the first ML model 110 is faulty.

The circuitry 202 may be further configured to receive the second user input based on the transmitted notification indicative of the fault output, wherein the data subset 116A may be received based on the second user input. For example, the user 118 may be prompted to provide an input to indicate whether or not the user 118 wishes to perform unlearning of certain data when the output of the first ML model 110 is determined as faulty. In an example, a dialogue box displaying a question such as, "The model is faulty. Do you want unlearning to be performed?" may be displayed on the display of the electronic device 102. Further options such as, "yes" or "no", may be provided to the user 118. The second user input may be received based on a user-selection of one of the options displayed on the display of the electronic device 102. For example, in a case where the user 118 selects "yes", the electronic device 102 may receive the data subset 116A associated with the user 118, based on the second user input. In an embodiment, the circuitry 202 may also display the time duration associated with the data subset 116A. Further the user 118 may be prompted to indicate whether the user 118 wishes the first ML model 110 to unlearn the features associated with the data subset 116A collected in the time duration. In another embodiment, the user 118 may simply be notified that the output of the data subset 116A is faulty and the user 118 may be requested to provide the time duration associated with the data subset 116A.

At 904, an operation for training of the second machine learning model may be executed. The circuitry 202 may be further configured to train the second machine learning model 112 based on the received data subset 116A. In an embodiment, the training of the second machine learning model 112 may be supervised. In an embodiment, the second set of labels (such as, the second set of labels 608 of FIG. 6) along with the received data subset 116A may be provided as the input to the second ML model 112. In another embodiment, the training of the second machine learning model 112 may be unsupervised. Herein, only the data subset 116A may be provided as the input to the second ML model 112. The second ML model 112 may learn with experience. Details related to the training of the second ML model 112 are further described, for example, in FIG. 8.

At 906, an operation for transformation function application may be executed. The circuitry 202 may be further configured to apply the transformation function 312 on the trained first machine learning model 110 based on the trained second machine learning model 112. The transformation function 312 may be applied based on a stacking of the trained first ML model 110 with the trained second ML model using the stack layer (such as, the stack layer 802 of FIG. 8) as an intermediate between the trained first ML model 110 and the trained second ML model 112. Further, a dot product of the trained first ML model 110 and the trained second ML model 112 may be divided by the modulus of the trained first ML model 110 to obtain the transformation function 312. Details related to the transformation function are further described, for example, in FIG. 8.

At 908, an operation for updating the trained first ML model may be executed. The circuitry 202 may be further configured to update the trained first ML model 110, based on the application of the transformation function, wherein the update of the trained first ML model 110 may correspond to the unlearning of at least one of the data subset 116A or the set of features associated with the second machine learning model 112. The trained first ML model 110 may be updated so that the updated first ML model 310 may not make recommendations based on the data subset 116A. Since the data subset 116A may not be associated with the user 118 of the electronic device 102, the unlearning of at least one of the data subset 116A or the set of features associated with the second machine learning model 112 by the trained first ML model 110 may enable the updated first ML model 310 to make optimum recommendations according to the behavior of the user 118. Thus, faulty outputs may be prevented. Thus, the electronic device 102 may enable unlearning of a certain wrongfully captured/erroneous dataset or undesired set of features in an existing model to obtain an updated model that achieves a desired output performance. The updated ML model may be optimum and may not make faulty recommendations as the least one of the data subset or the set of features associated with the second machine learning model may have been unlearnt by the trained first ML model. Details related to the updating of the trained first ML model are further described, for example, in FIG. 8.

Figure 10:
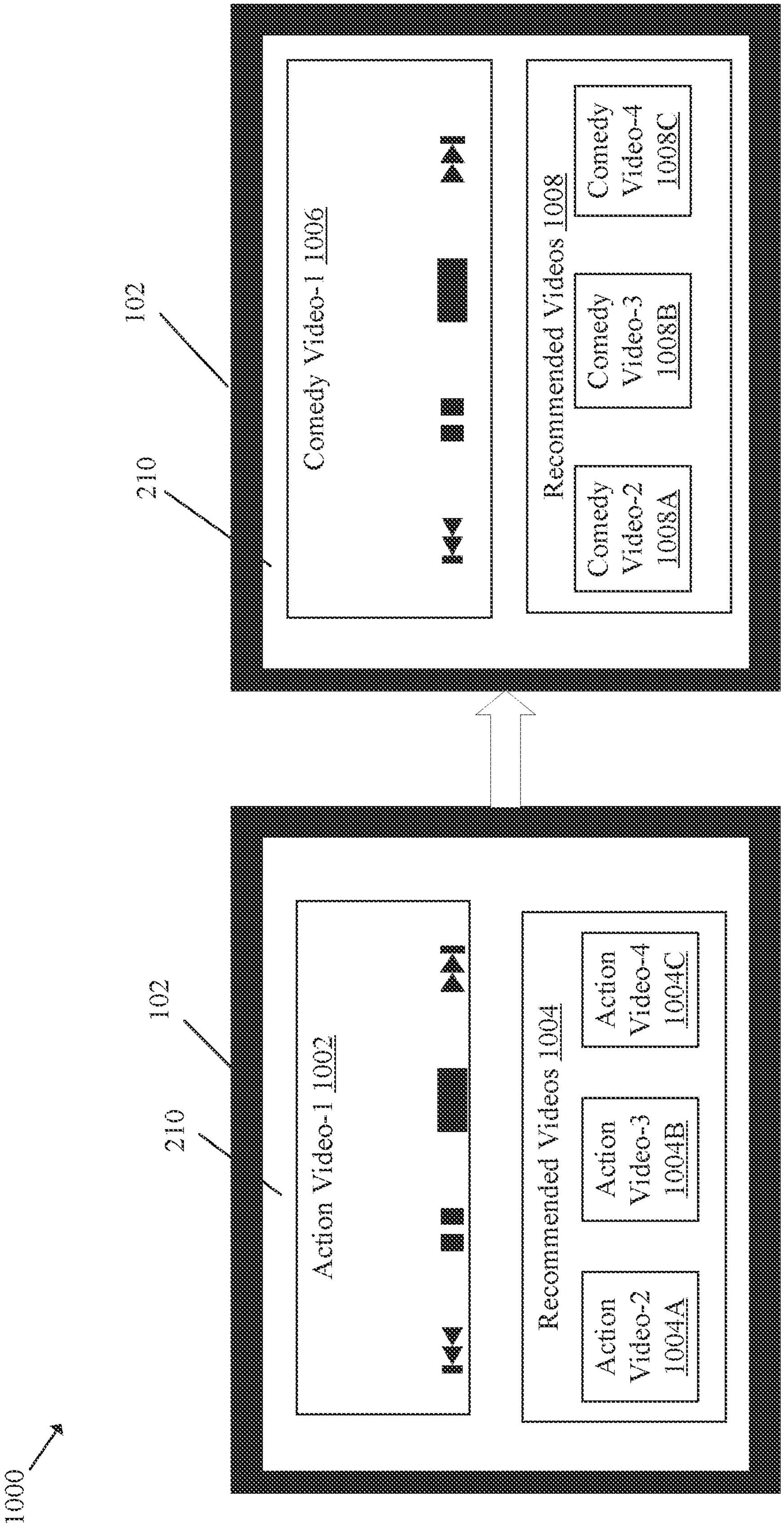
FIG. 10 is a diagram that illustrates an exemplary scenario for machine learning model update for content-based recommendations, in accordance with an embodiment of the disclosure.

FIG. 10 is a diagram that illustrates an exemplary scenario for machine learning model update for content-based recommendations, in accordance with an embodiment of the disclosure. FIG. 10 is described in conjunction with elements from FIG. 1, FIG. 2, FIG. 3, FIG. 4, FIG. 5, FIG. 6, FIG. 7, FIG. 8, and FIG. 9. With reference to FIG. 10, there is shown an exemplary scenario 1000. The scenario 1000 may include the electronic device 102, the display device 210, an action video-1 1002, recommended videos 1004, a comedy video-1 1006, and recommended videos 1008. The recommended videos 1004 may include an action video-2 1004A, an action video-3 10048, and an action video-4 1004C. The recommended videos 1008 may include a comedy video-2 1008A, a comedy video-3 1008B, and a comedy video-4 1008C. A set of operations associated the scenario 1000 is described herein.

In the scenario 1000 of FIG. 10, the electronic device 102 may be used by the user such as, the user 118 of FIG. 1. The user 118 may lend the electronic device 102 to a person A for a certain time duration. The person A may watch the action video-1 1002 on a media streaming platform on the electronic device 102. However, the user 118 may not prefer action videos and may prefer to watch comedy videos. Alternatively, the user 118 may have watched the action video-1 1002 for a change. However, the user 118 may not prefer such action videos and may prefer watch comedy videos. In both the cases, since the action video-1 1002 may have been watched, the first ML model 110 of FIG. 1 may be trained on such videos and the recommended videos 1004 including other action videos (such as, the action video-2 1004A, the action video-3 10048, and the action video-4 1004C) may be recommended to the user 118. Since, the user 118 may not prefer to watching the recommended videos 1004, the user 118 may provide the first user input and/or the second user input to update the trained first ML model 110 such that the information related to the action video-1 1002 may be unlearnt by the trained first ML model 110. The trained first ML model may be updated based on the application of the transformation function on the trained first machine learning model 110 using the trained second machine learning model 112, as described, for example, in FIGS. 3, 4, 5, 6, 7, 8, and 9. The updated first ML model 110 may make optimum recommendations such as, the recommended videos 1008 including comedy video-2 1008A, the comedy video-3 1008B, and the comedy video-4 1008C, based on the comedy video-1 1006 watched by the user. Thus, based on the unlearning by the trained first ML model 110, the user 118 may be recommended videos based on the normal behavior of the user 118 and not on the behavior of the person A (or an abnormal behavior of the user 118).

It may be noted that the electronic device 102 of the present disclosure may be used in a number of applications. In an example, the electronic device 102 may be used in artificial intelligence (AI)-based model that may aim to provide the personalized recommendations to the users. The process of personalization may need continuous acquisition of the user's behavioral data. If newly received data may not be rational, then it may lead to corruption of the existing artificial intelligence (AI)-based model as such data may lead the AI-based model it to a faulty state. In few cases, if an integrity of data is questioned after development of the AI-based model, then unlearning, as described in the present disclosure, may be one of the preferable options, if not the only option.

In a second application, privacy legislations and laws of various countries and jurisdictions may include provisions that may require a right to be forgotten. Hence, a demand to be forgotten may be addressed by the recommendation model, based on the unlearning of the undesired data or a set of features related to an ML model trained based on such undesired data. For example, the user 118 may have watched some videos related to news. However, the user 118 may want the trained first ML model (such as, the trained first ML model 110 of FIG. 1) to forget the videos watched by the user 118. In such cases, the trained first ML model (such as, the trained first ML model 110 of FIG. 1) may be updated to unlearn at least one of the dataset (related to the news videos) or the set of features associated with the second machine learning model (such as, the trained second ML model 112 of FIG. 1).

In a third application, there may be cases of sudden events which may influence users to deviate from their usual behavior or personality traits for a certain time period. Detection of such events and unlearning the behavioral data may be necessary in order to have a legitimate model performance. For example, the user may have been gloomy due to a sudden event in the life of the user. The user may have watched sad videos that the user may not generally prefer to watch. In such cases, the trained first ML model (such as, the trained first ML model 110 of FIG. 1) may be updated to unlearn at least the dataset or the features associated with the sad videos.

It should be noted that the scenario 1000 of FIG. 10 is for exemplary purposes and should not be construed to limit the scope of the disclosure.

Figure 11:
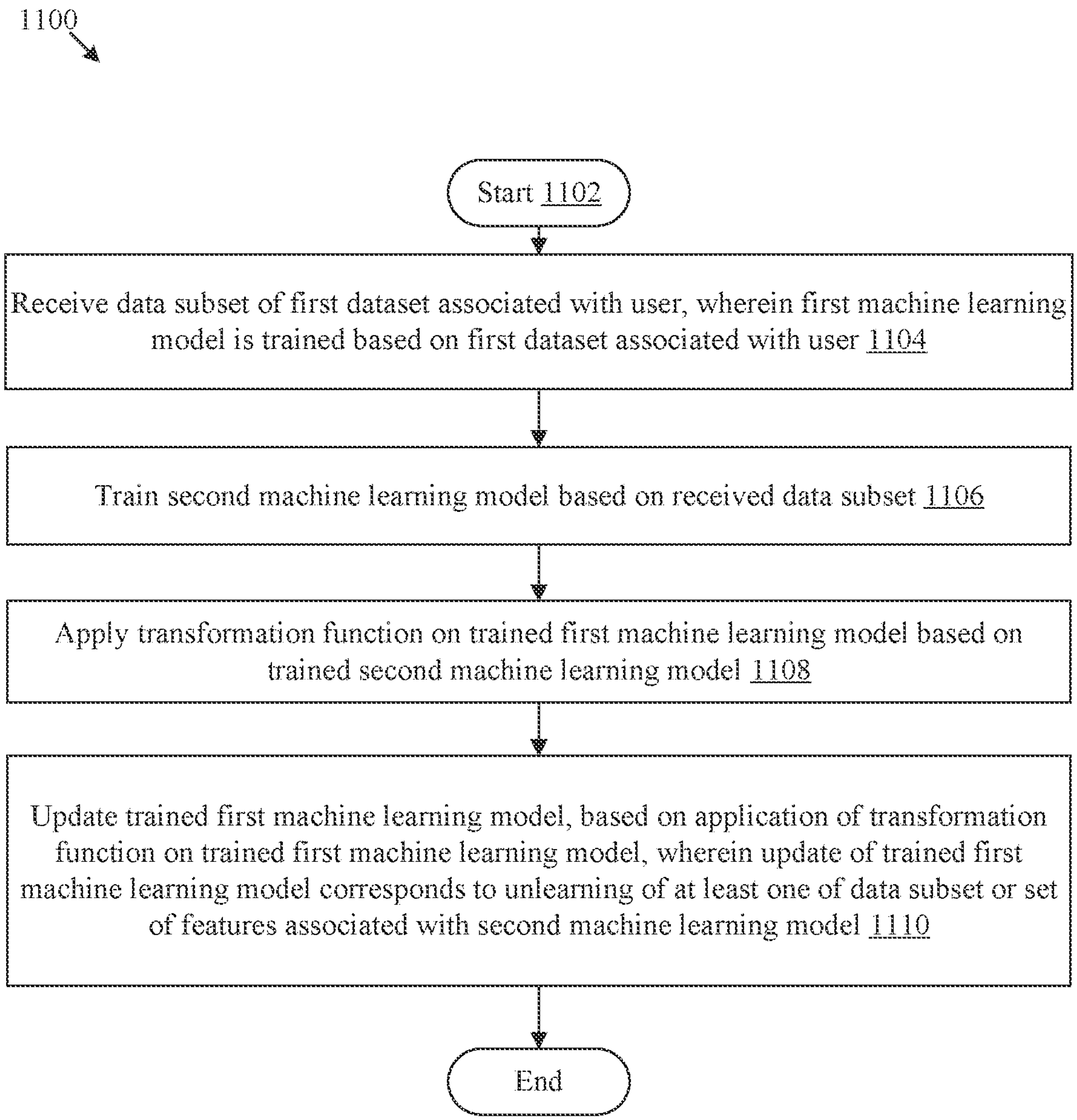
FIG. 11 is a flowchart that illustrates operations of an exemplary method for, in accordance with an embodiment of the disclosure.

FIG. 11 is a flowchart that illustrates operations of an exemplary method for, in accordance with an embodiment of the disclosure. FIG. 11 is described in conjunction with elements from FIG. 1, FIG. 2, FIG. 3, FIG. 4, FIG. 6, FIG. 7, FIG. 8, FIG. 9, and FIG. 10. With reference to FIG. 11, there is shown a flowchart 1100. The flowchart 1100 may include operations from 1102 to 1110 and may be implemented by the electronic device 102 of FIG. 1 or by the circuitry 202 of FIG. 2. The flowchart 1100 may start at 1102 and proceed to 1104.

At 1104, the data subset 116A of the first dataset 114 associated with the user (such as, the user 118 of FIG. 1) may be received, wherein the first machine learning model (such as, the first machine learning model 110 of FIG. 1) may be trained based on the first dataset (such as, the first dataset 114 of FIG. 1) associated with the user (such as, the user 118 of FIG. 1). The circuitry 202 may be configured to receive the data subset 116A associated with the user 118, wherein the first machine learning model 110 may be trained based on the first dataset 114 associated with the user 118. The first dataset 114 may be the behavioral data associated with the user 118. The first dataset 114 may include a plurality of datasets (such as, the plurality of datasets 116 of FIG. 1). However, in some cases, one or more datasets of the plurality of datasets may not be related to the user 118 and may be erroneous for the user 118. Such datasets, that may not be associated with the user 118, may be called as the data subset 116A. Details related to the first ML model 110 are further described, for example, in FIG. 3.

At 1106, the second machine learning model (such as, the second machine learning model 112 of FIG. 1) may be trained based on the received data subset (such as, the received data subset 116A of FIG. 1). The circuitry 202 may be further configured to train the second machine learning model 112 based on the received data subset 116A. Details related to the training of the second ML model are further described, for example, in FIG. 8.

At 1108, the transformation function (such as, the transformation function 312 of FIG. 3) may be applied on the trained first machine learning model (such as, the trained first machine learning model 110 of FIG. 1) based on the trained second machine learning model (such as, the trained second machine learning model 112 of FIG. 1). The circuitry 202 may be further configured to apply the transformation function on the trained first machine learning model 110 based on the trained second machine learning model 112. The transformation function may be applied based on a stacking of the trained first ML model 110 with the trained second ML model 112 using the stack layer (such as, the stack layer 802 of FIG. 8) as an intermediate between the trained first ML model 110 and the trained second ML model 112. Details related to the transformation function are further described, for example, in FIG. 8.

At 1110, the trained first ML model (such as, the trained first ML model 110 of FIG. 1) may be updated based on the application of the transformation function (such as, the transformation function 312 of FIG. 3) on the trained first ML model 110, wherein the update of the trained first ML model 110 may correspond to the unlearning of at least one of the data subset (such as, the data subset 116A of FIG. 1) or the set of features associated with the second machine learning model 112. The circuitry 202 may be further configured to update the trained first ML model 110, based on the application of the transformation function on the trained first ML model 110. The update of the trained first ML model 110 may correspond to an unlearning of at least one of the data subset 116A or the set of features associated with the second machine learning model 112. The trained first ML model 110 may be updated so that the updated first ML model 110 may not make recommendations based on the data subset 116A. Details related to the updating of the trained first ML model 110 are further described, for example, in FIG. 8. Control may pass to end.

Although the flowchart 1100 is illustrated as discrete operations, such as, 1104, 1106, 1108, and 1110 the disclosure is not so limited. Accordingly, in certain embodiments, such discrete operations may be further divided into additional operations, combined into fewer operations, or eliminated, depending on the implementation without detracting from the essence of the disclosed embodiments.

Various embodiments of the disclosure may provide a non-transitory computer-readable medium and/or storage medium having stored thereon, computer-executable instructions executable by a machine and/or a computer to operate an electronic device (for example, the electronic device 102 of FIG. 1). Such instructions may cause the electronic device 102 to perform operations that may include receipt of a data subset (such as, the data subset 116A of FIG. 1) of a first dataset (such as, the first dataset 114 of FIG. 1) associated with a user (such as, the user 118 of FIG. 1). A first machine learning model (such as, the first machine learning model 110 of FIG. 1) may be trained based on the received first dataset (such as, the first dataset 114 of FIG. 1) associated with the user 118. The operations may further include training a second machine learning model (such as, the second machine learning model 112 of FIG. 1) based on the received data subset 116A. The operations may further include application of a transformation function (such as, the transformation function 312 of FIG. 3) on the trained first machine learning model 110 based on the trained second machine learning model 112. The operations may further include updating the trained first machine learning model 110, based on the application of the transformation function 312 on the trained first machine learning model 110. The update of the trained first machine learning model 110 may correspond to an unlearning of at least one of the data subset 116A or a set of features associated with the second machine learning model 112.

Exemplary aspects of the disclosure may provide an electronic device (such as, the electronic device 102 of FIG. 1) that includes circuitry (such as, the circuitry 202). The circuitry 202 may be configured to receive a data subset (such as, the data subset 116A of FIG. 1) of a first dataset (such as, the first dataset 114 of FIG. 1) associated with a user (such as, the user 118 of FIG. 1). A first machine learning model (such as, the first machine learning model 110 of FIG. 1) may be trained based on the received first dataset (such as, the first dataset 114 of FIG. 1) associated with the user. The circuitry 202 may be configured to train a second machine learning model (such as, the second machine learning model 112 of FIG. 1) based on the received data subset 116A. The circuitry 202 may be configured to apply a transformation function (such as, the transformation function 312 of FIG. 3) on the trained first machine learning model 110 based on the trained second machine learning model 112. The circuitry 202 may be configured to update the trained first machine learning model 110, based on the application of the transformation function 312 on the trained first machine learning model 110. The update of the trained first machine learning model 110 may correspond to an unlearning of at least one of the data subset 116A or a set of features associated with the second machine learning model 112.

In an embodiment, the circuitry 202 may be further configured to receive a first user input indicative of a time duration, wherein the data subset 116A may be received based on the received first user input.

In an embodiment, the trained first machine learning model 110 may correspond to a recommendation model, and the updated first machine learning model (e.g., the updated first machine learning model 810) may be configured to output personalized recommendations, based on the received first user input.

In an embodiment, the circuitry 202 may be further configured to compare the output of the trained first machine learning model 110 with the threshold. The circuitry 202 may be further configured to determine the output as faulty based on the comparison of the output of the trained first machine learning model 110 with the threshold. The circuitry 202 may be further configured to transmit a notification based on the determination that the output is faulty. The circuitry 202 may be further configured to receive a second user input based on the transmitted notification indicative of the faulty output, wherein the data subset 116A may be received based on the second user input.

In an embodiment, the circuitry 202 may be further configured to extract a first set of labels (e.g., the first set of labels 702) associated with the received first dataset 114. The circuitry 202 may be further configured to extract a second set of labels (e.g., the second set of labels 704) associated with the received data subset 116A. The circuitry 202 may be further configured to remove the extracted second set of labels 704 associated with the data subset 116A from the extracted first set of labels 702 associated with the received first dataset 114. The circuitry 202 may be further configured to determine the third set of labels based on the removal of the extracted second set of labels 704 associated with the data subset 116A from the extracted first set of labels 702 associated with the received first dataset 114.

In an embodiment, the circuitry 202 may be further configured to determine whether each label of the determined third set of labels corresponds to a categorical label. The circuitry 202 may be further configured to determine the count of the determined third set of labels based on the determination that the determined category of the determined third set of labels is categorical. The circuitry 202 may be further configured to determine a fourth label (e.g., the fourth label 708) based on the determined count of the determined third set of labels. The fourth label 708 may correspond to the maximum count in the determined third set of labels. The second machine learning model 112 may be further trained based on the determined fourth label 708.

In an embodiment, the circuitry 202 may be further configured to determine whether each label of the determined third set of labels corresponds to the numerical label. The circuitry 202 may be further configured to determine the mean of determined third set of labels based on the determination that each of the determined third set of labels corresponds to the numerical label. The circuitry 202 may be further configured to determine a fifth label (e.g., the fifth label 710) based on the determined mean of each label in the determined third set of labels. The second machine learning model 112 may be further trained based on the determined fifth label 710.

In an embodiment, the circuitry 202 may be further configured to construct a stack layer (e.g., the stack layer 802) associated with the transformation function 312, wherein the stack layer 802 may be configured to stack the trained first machine learning model 110 and the trained second machine learning model 112 to update the trained first machine learning model 110.

In an embodiment, the transformation function 312 may include the constructed stack layer 802 and a set of deep neural network (DNN) layers (such as, the CNN layers 804).

In an embodiment, the transformation function 312 may correspond to a dot product of a first output of the trained first machine learning model 110 with a second output of the trained second machine learning model 112.

In an embodiment, the transformation function may further correspond to a normalization of the dot product based on the first output.

The present disclosure may also be positioned in a computer program product, which comprises all the features that enable the implementation of the methods described herein, and which when loaded in a computer system is able to carry out these methods. Computer program, in the present context, means any expression, in any language, code or notation, of a set of instructions intended to cause a system with information processing capability to perform a particular function either directly, or after either or both of the following: a) conversion to another language, code or notation; b) reproduction in a different material form.

While the present disclosure is described with reference to certain embodiments, it will be understood by those skilled in the art that various changes may be made, and equivalents may be substituted without departure from the scope of the present disclosure. In addition, many modifications may be made to adapt a particular situation or material to the teachings of the present disclosure without departure from its scope. Therefore, it is intended that the present disclosure is not limited to the embodiment disclosed, but that the present disclosure will include all embodiments that fall within the scope of the appended claims.

What is claimed is:

1. An electronic device, comprising:
circuitry configured to:
receive a data subset of a first dataset associated with a user;
train a first machine learning model based on the first dataset associated with the user;
extract a first set of labels associated with the first dataset;
extract a second set of labels associated with the received data subset;
remove the extracted second set of labels associated with the received data subset from the extracted first set of labels associated with the first dataset;
determine a third set of labels based on the removal of the extracted second set of labels associated with the data subset from the extracted first set of labels associated with the first dataset;
determine that each label of the determined third set of labels corresponds to a categorical label;
determine, based on the determination that each of the determined third set of labels corresponds to a categorical label, a count of the determined third set of labels;
determine a fourth label based on the determined count of the determined third set of labels, wherein the fourth label corresponds to a maximum count in the determined third set of labels;
train a second machine learning model based on the received data subset and the determined fourth label;
apply, based on the trained second machine learning model, a transformation function on the trained first machine learning model; and
update the trained first machine learning model, based on the application of the transformation function on the trained first machine learning model, wherein
the update of the trained first machine learning model corresponds to an unlearning of at least one of the received data subset or a set of features associated with the second machine learning model.

2. The electronic device according to claim 1, wherein the circuitry is further configured to receive a first user input indicative of a time duration associated with the data subset, and the data subset is received based on the received first user input.

3. The electronic device according to claim 2, wherein
the trained first machine learning model corresponds to a recommendation model, and
the updated first machine learning model is configured to output personalized recommendations, based on the received first user input.

4. The electronic device according to claim 1, wherein the circuitry is further configured to:
compare an output of the trained first machine learning model with a threshold;
determine the output as faulty based on the comparison of the output of the trained first machine learning model with the threshold;
transmit a notification based on the determination that the output is faulty; and
receive a second user input based on the transmitted notification indicative of the faulty output, wherein
the data subset is received based on the second user input.

5. The electronic device according to claim 1, wherein the circuitry is further configured to:
determine that each label of the determined third set of labels corresponds to a numerical label;
determine, based on the determination that each of the determined third set of labels corresponds to the numerical label, a mean of the determined third set of labels;
determine a fifth label based on the determined mean of the determined third set of labels; and
train the second machine learning model based on the determined fifth label.

6. The electronic device according to claim 1, wherein the circuitry is further configured to:
construct a stack layer associated with the transformation function, wherein
the stack layer is configured to stack the trained first machine learning model and the trained second machine learning model to update the trained first machine learning model.

7. The electronic device according to claim 6, wherein the transformation function includes the constructed stack layer and a set of deep neural network (DNN) layers.

8. The electronic device according to claim 6, wherein the transformation function corresponds to a dot product of a first output of the trained first machine learning model with a second output of the trained second machine learning model.

9. The electronic device according to claim 8, wherein the transformation function further corresponds to a normalization of the dot product based on the first output.

10. A method, comprising:
in an electronic device:
receiving a data subset of a first dataset associated with a user;
training a first machine learning model based on the first dataset associated with the user;
extracting a first set of labels associated with the first dataset;
extracting a second set of labels associated with the received data subset;
removing the extracted second set of labels associated with the received data subset from the extracted first set of labels associated with the first dataset;
determining a third set of labels based on the removal of the extracted second set of labels associated with the data subset from the extracted first set of labels associated with the first dataset;
determining that each label of the determined third set of labels corresponds to a categorical label;
determining, based on the determination that each of the determined third set of labels corresponds to a categorical label, a count of the determined third set of labels;
determining a fourth label based on the determined count of the determined third set of labels, wherein the fourth label corresponds to a maximum count in the determined third set of labels;
training a second machine learning model based on the received data subset and the determined fourth label;
applying, based on the trained second machine learning model, a transformation function on the trained first machine learning model; and updating the trained first machine learning model, based on the application of the transformation function on the trained first machine learning model, wherein the update of the trained first machine learning model corresponds to an unlearning of at least one of the received data subset or a set of features associated with the second machine learning model.

11. The method according to claim 10, further comprising receiving a first user input indicative of a time duration associated with the data subset, wherein the data subset is received based on the received first user input.

12. The method according to claim 11, wherein the trained first machine learning model corresponds to a recommendation model, and the updated first machine learning model is configured to output personalized recommendations, based on the received first user input.

13. The method according to claim 10, further comprising:

determining that each label of the determined third set of labels corresponds to a numerical label;

determining a mean of the determined third set of labels based on the determination that each of the determined third set of labels corresponds to the numerical label;

determining a fifth label based on the determined mean of the determined third set of labels; and training the second machine learning model based on the determined fifth label.

14. The method according to claim 10, further comprising:

constructing a stack layer associated with the transformation function, wherein the stack layer is configured to stack the trained first machine learning model and the trained second machine learning model to update the trained first machine learning model.

15. The method according to claim 14, wherein the transformation function corresponds to a dot product of a first output of the trained first machine learning model with a second output of the trained second machine learning model.

16. A non-transitory computer-readable medium having stored thereon, computer-executable instructions that when executed by an electronic device, causes the electronic device to execute operations, the operations comprising:

receiving a data subset of a first dataset associated with a user;

training a first machine learning model based on the first dataset associated with the user;

extracting a first set of labels associated with the first dataset;

extracting a second set of labels associated with the received data subset;

removing the extracted second set of labels associated with the received data subset from the extracted first set of labels associated with the first dataset;

determining a third set of labels based on the removal of the extracted second set of labels associated with the data subset from the extracted first set of labels associated with the first dataset;

determining that each label of the determined third set of labels corresponds to a categorical label;

determining, based on the determination that each of the determined third set of labels corresponds to a categorical label, a count of the determined third set of labels;

determining a fourth label based on the determined count of the determined third set of labels, wherein the fourth label corresponds to a maximum count in the determined third set of labels;

training a second machine learning model based on the received data subset and the determined fourth label;

applying, based on the trained second machine learning model, a transformation function on the trained first machine learning model; and updating the trained first machine learning model, based on the application of the transformation function on the trained first machine learning model, wherein the update of the trained first machine learning model corresponds to an unlearning of at least one of the received data subset or a set of features associated with the second machine learning model.

* * * * *